(12) United States Patent
Ikegawa et al.

(10) Patent No.: US 9,230,568 B1
(45) Date of Patent: Jan. 5, 2016

(54) MAGNETIC HEAD FOR PERPENDICULAR MAGNETIC RECORDING INCLUDING A COIL HAVING AN INCLINED FRONT END FACE

(71) Applicants: Yukinori Ikegawa, Milpitas, CA (US); Yoshitaka Sasaki, Santa Clara, CA (US); Hiroyuki Ito, Milpitas, CA (US); Kazuki Sato, Milpitas, CA (US); Shigeki Tanemura, Milpitas, CA (US); Hironori Araki, Milpitas, CA (US)

(72) Inventors: Yukinori Ikegawa, Milpitas, CA (US); Yoshitaka Sasaki, Santa Clara, CA (US); Hiroyuki Ito, Milpitas, CA (US); Kazuki Sato, Milpitas, CA (US); Shigeki Tanemura, Milpitas, CA (US); Hironori Araki, Milpitas, CA (US)

(73) Assignee: HEADWAY TECHNOLOGIES, INC., Milpitas, CA (US)

( * ) Notice: Subject to any disclaimer, the term of this patent is extended or adjusted under 35 U.S.C. 154(b) by 0 days.

(21) Appl. No.: 14/688,450

(22) Filed: Apr. 16, 2015

(51) Int. Cl.
  *G11B 5/127* (2006.01)
  *G11B 5/17* (2006.01)
  *G11B 5/187* (2006.01)

(52) U.S. Cl.
  CPC ............... *G11B 5/1278* (2013.01); *G11B 5/17* (2013.01); *G11B 5/187* (2013.01)

(58) Field of Classification Search
  CPC ..... G11B 5/1278; G11B 5/3123; G11B 5/3116
  USPC .................................................... 360/123.05
  See application file for complete search history.

(56) References Cited

U.S. PATENT DOCUMENTS

| 8,345,384 | B1 * | 1/2013 | Sasaki et al. ............. 360/125.15 |
| 8,385,019 | B1 | 2/2013 | Sasaki et al. |
| 8,837,088 | B1 * | 9/2014 | Kimura et al. ............ 360/125.3 |
| 2005/0041337 | A1 * | 2/2005 | Yazawa et al. ............... 360/126 |
| 2007/0285837 | A1 * | 12/2007 | Im et al. ........................ 360/126 |

* cited by examiner

Primary Examiner — Angel Castro
(74) Attorney, Agent, or Firm — Oliff PLC

(57) ABSTRACT

A magnetic head includes a coil, a main pole, a trailing shield, a gap section, a return path section, and a coil underlayer. The main pole has a top surface including a first inclined portion and a flat portion. The coil includes a specific coil element. The specific coil element has a bottom surface facing toward the top surface of the main pole, and a front end face inclined with respect to a medium facing surface. The coil underlayer lies under the specific coil element, and has a front end face. The trailing shield includes a portion interposed between the front end face of the coil underlayer and the medium facing surface. The bottom surface of the specific coil element includes a second inclined portion.

9 Claims, 15 Drawing Sheets

MAGNETIC HEAD FOR PERPENDICULAR MAGNETIC RECORDING INCLUDING A COIL HAVING AN INCLINED FRONT END FACE

BACKGROUND OF THE INVENTION

1. Field of the Invention

The present invention relates to a magnetic head for perpendicular magnetic recording for use to write data on a recording medium by means of a perpendicular magnetic recording system, and to a method of manufacturing the same.

2. Description of the Related Art

The recording systems of magnetic read/write apparatuses include a longitudinal magnetic recording system in which the magnetization of signals is directed along the plane of a recording medium (the longitudinal direction), and a perpendicular magnetic recording system in which the magnetization of signals is directed perpendicular to the plane of a recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure in which a read head unit having a magnetoresistive element (hereinafter, also referred to as MR element) for reading and a write head unit having an induction-type electromagnetic transducer for writing are stacked on a substrate. The write head unit includes a coil and a main pole. The main pole has an end face located in a medium facing surface facing a recording medium. The coil produces a magnetic field corresponding to data to be written on the recording medium. The main pole passes a magnetic flux corresponding to the magnetic field produced by the coil, and produces a write magnetic field from its end face.

A magnetic head for use in a magnetic disk drive such as a hard disk drive is typically provided in a slider. The slider has the medium facing surface. The medium facing surface has an air inflow end (a leading end) and an air outflow end (a trailing end). An airflow that comes from the air inflow end into the space between the medium facing surface and the recording medium causes the slider to slightly fly over the surface of the recording medium.

Here, the side of the positions closer to the leading end relative to a reference position will be referred to as the leading side, and the side of the positions closer to the trailing end relative to the reference position will be referred to as the trailing side. The leading side is the rear side in the direction of travel of the recording medium relative to the slider. The trailing side is the front side in the direction of travel of the recording medium relative to the slider.

The magnetic head is typically disposed near the trailing end of the medium facing surface of the slider. In a magnetic disk drive, positioning of the magnetic head is performed by a rotary actuator, for example. In this case, the magnetic head moves over the recording medium along a circular orbit about the center of rotation of the rotary actuator. In such a magnetic disk drive, a tilt of the magnetic head with respect to the tangent of the circular track, which is called a skew, occurs depending on the position of the magnetic head across the tracks.

Particularly, in a magnetic disk drive of the perpendicular magnetic recording system which is higher in capability of writing on a recording medium than the longitudinal magnetic recording system, the skew mentioned above can cause the phenomenon that signals already written on one or more tracks that are adjacent to a track targeted for writing are erased or attenuated during writing of a signal on the track targeted for writing. In the present application, this phenomenon will be called unwanted erasure. The unwanted erasure includes adjacent track erasure (ATE) and wide-area track erasure (WATE). To achieve higher recording densities, it is necessary to prevent the occurrence of unwanted erasure.

In order to prevent the occurrence of unwanted erasure induced by a skew and achieve higher recording densities, it is effective to configure the main pole so that the thickness of its portion near the medium facing surface decreases with increasing proximity to the medium facing surface, and also provide a write shield that has an end face located in the medium facing surface and surrounding the end face of the main pole.

In a magnetic head including the write shield, there is typically provided a return path section for connecting the write shield to a portion of the main pole located away from the medium facing surface. The write shield, the return path section and the main pole define a space for a portion of the coil to pass therethrough. The write shield and the return path section have the function of capturing a magnetic flux that is produced from the end face of the main pole and spreads in directions other than a direction perpendicular to the plane of the recording medium, thereby preventing the magnetic flux from reaching the recording medium. The write shield and the return path section also have the function of allowing a magnetic flux that has been produced from the end face of the main pole and has magnetized a portion of the recording medium to flow back to the main pole.

The position of an end of a record bit to be recorded on the recording medium is determined by the trailing-side edge of the end face of the main pole located in the medium facing surface. In order to define the position of the end of the record bit accurately, it is therefore important that the write shield include a trailing shield which is located on the trailing side relative to the main pole.

With increases in frequency of write signals to achieve higher recording densities, it is required of the magnetic head that the write current flowing through the coil should exhibit a rapid rise. To meet such a requirement, it is effective to reduce the length of the magnetic path passing through the write shield, the return path section and the main pole. To achieve this, it is effective to reduce the distance between the medium facing surface and an end of the coil that is closest to the medium facing surface. Further, if the coil is a helical coil wound around the main pole, it is possible to enhance the write magnetic field by reducing the distance from end of the coil closest to the medium facing surface to each of the medium facing surface and the main pole.

U.S. Pat. No. 8,385,019 B1 discloses a magnetic head having the following features. The magnetic head includes a main pole, a coil, a write shield and a return path section. The main pole has a top surface including an inclined portion and a flat portion, the inclined portion being located closer to the medium facing surface than the flat portion. The inclined portion is inclined with respect to a direction perpendicular to the medium facing surface. The flat portion extends in a direction substantially perpendicular to the medium facing surface. The write shield includes a trailing shield. The coil includes a coil element located on the trailing side relative to the main pole, the coil element extending to pass through the space defined by the main pole, the trailing shield and the return path section. The coil element has a first inclined surface inclined with respect to the medium facing surface. The trailing shield has a second inclined surface. The second inclined surface includes a first portion opposed to the inclined portion of the top surface of the main pole, and a second portion opposed to the first inclined surface of the coil element. This magnetic head allows for a reduction in length of the magnetic path passing through the trailing shield, the return path section and the main pole.

However, the magnetic head disclosed in U.S. Pat. No. 8,385,019 B1 has room for improvement in the following respects. Specifically, in this magnetic head, the first inclined surface of the coil element and the inclined portion of the top surface of the main pole are formed simultaneously by ion beam etching such that they become located in one plane. In this case, the location and inclination angle of the inclined portion of the top surface of the main pole vary easily in response to variations in thickness of the coil element or variations in conditions of ion beam etching. Variations in the location and inclination angle of the inclined portion vary the shape of the end face of the main pole and the shape of a portion of the main pole near the medium facing surface. Such variations in turn vary the write characteristics.

In the magnetic head disclosed in U.S. Pat. No. 8,385,019 B1, as mentioned above, the first inclined surface of the coil element and the inclined portion of the top surface of the main pole are located in one plane. Due to this configuration, it is not possible for this magnetic head to achieve further reduction in length of the aforementioned magnetic path by further reducing the distance between the medium facing surface and the end of the coil closest to the medium facing surface.

OBJECTS AND SUMMARY OF THE INVENTION

It is a first object of the present invention to provide a magnetic head for perpendicular magnetic recording that is capable of preventing the occurrence of unwanted erasure induced by a skew and shortening the length of a magnetic path that passes through the trailing shield, the return path section and the main pole.

It is a second object of the present invention to provide a method of manufacturing a magnetic head for perpendicular magnetic recording that provides the aforementioned benefits and achieves reduced variations in write characteristics.

A magnetic head for perpendicular magnetic recording of the present invention, and a magnetic head for perpendicular magnetic recording manufactured by a manufacturing method of the present invention each include a medium facing surface configured to face a recording medium, a coil for producing a magnetic field corresponding to data to be written on the recording medium, a main pole, a trailing shield formed of a magnetic material, a gap section formed of a nonmagnetic material, a return path section formed of a magnetic material, and a coil underlayer formed of a nonmagnetic material. The main pole has an end face located in the medium facing surface. The main pole is configured to pass a magnetic flux corresponding to the magnetic field produced by the coil, and to produce a write magnetic field for use to write data on the recording medium by means of a perpendicular magnetic recording system. The trailing shield has an end face located on the front side in the direction of travel of the recording medium relative to the end face of the main pole. The gap section is located between the main pole and the trailing shield. The return path section is located on the front side in the direction of travel of the recording medium relative to the main pole.

The return path section connects the trailing shield and part of the main pole located away from the medium facing surface to each other so that a space is defined by the main pole, the gap section, the trailing shield and the return path section. The coil includes at least one first coil element extending to pass through the space.

The main pole has a top surface located at the front-side end of the main pole in the direction of travel of the recording medium. The top surface of the main pole includes a first inclined portion and a flat portion, the first inclined portion being located closer to the medium facing surface than the flat portion. The first inclined portion has a first end located in the medium facing surface and a second end opposite to the first end. The first inclined portion is inclined with respect to the medium facing surface and a direction perpendicular to the medium facing surface such that the second end is located on the front side in the direction of travel of the recording medium relative to the first end. The flat portion extends substantially perpendicular to the medium facing surface.

The at least one first coil element includes a specific coil element. The specific coil element has a bottom surface facing toward the top surface of the main pole, and a front end face facing toward the medium facing surface. The front end face of the specific coil element has a third end closest to the main pole, and a fourth end opposite to the third end. The front end face of the specific coil element is inclined with respect to the medium facing surface and the direction perpendicular to the medium facing surface such that the fourth end is located at a greater distance from the medium facing surface than is the third end.

The coil underlayer lies under at least the specific coil element of the coil, and has a front end face facing toward the medium facing surface. The trailing shield includes a portion interposed between the front end face of the coil underlayer and the medium facing surface.

In the magnetic head of the present invention, the bottom surface of the specific coil element includes a second inclined portion. The second inclined portion has a fifth end closest to the medium facing surface, and a sixth end opposite to the fifth end. The fifth end coincides with the third end of the front end face of the specific coil element. The second inclined portion is inclined with respect to the medium facing surface and the direction perpendicular to the medium facing surface such that the sixth end is located on the front side in the direction of travel of the recording medium relative to the fifth end. The front end face of the specific coil element is inclined at a greater angle with respect to the direction perpendicular to the medium facing surface than is the second inclined portion.

In the magnetic head of the present invention, the front end face of the specific coil element may be inclined at a greater angle with respect to the direction perpendicular to the medium facing surface than is the first inclined portion.

The magnetic head of the present invention may further include a nonmagnetic section formed of a nonmagnetic material and lying on the flat portion of the top surface of the main pole. The nonmagnetic section has a top surface located at the front-side end of the nonmagnetic section in the direction of travel of the recording medium, and a front end face facing toward the medium facing surface and contiguous with the first inclined portion. In this case, the coil underlayer may include a portion interposed between the front end face of the nonmagnetic section and the second inclined portion.

In the magnetic head of the present invention, the coil may further include at least one second coil element, the at least one second coil element being located such that the main pole is interposed between the at least one first coil element and the at least one second coil element, and extending in a direction intersecting the direction perpendicular to the medium facing surface.

The manufacturing method for the magnetic head of the present invention includes a first step of forming the main pole, the gap section, the coil underlayer and the coil, and a second step of forming the trailing shield and the return path section.

The first step includes the steps of: forming a magnetic layer; etching the magnetic layer so as to provide the magnetic layer with the first inclined portion and the flat portion and thereby make the magnetic layer into the main pole; forming a gap layer after the step of etching the magnetic layer, the gap layer constituting at least part of the gap section; forming an initial coil underlayer to cover the main pole and the gap layer; forming an initial coil which will later become the coil, the initial coil including an initial coil element lying on the initial coil underlayer; and etching the initial coil element and the initial coil underlayer. The step of etching the initial coil element and the initial coil underlayer etches the initial coil element and the initial coil underlayer so as to provide the initial coil element with the front end face of the specific coil element and thereby make the initial coil element into the specific coil element, and provide the initial coil underlayer with the front end face of the coil underlayer and thereby make the initial coil underlayer into the coil underlayer.

The second step forms the trailing shield and at least part of the return path section connected to the trailing shield after the first step.

In the manufacturing method for the magnetic head of the present invention, the front end face of the specific coil element may be inclined at a greater angle with respect to the direction perpendicular to the medium facing surface than is the first inclined portion.

In the manufacturing method for the magnetic head of the present invention, the specific coil element may be formed so that the bottom surface of the specific coil element includes a second inclined portion. The second inclined portion has a fifth end closest to the medium facing surface, and a sixth end opposite to the fifth end. The fifth end coincides with the third end of the front end face of the specific coil element. The second inclined portion is inclined with respect to the medium facing surface and the direction perpendicular to the medium facing surface such that the sixth end is located on the front side in the direction of travel of the recording medium relative to the fifth end. The front end face of the specific coil element is inclined at a greater angle with respect to the direction perpendicular to the medium facing surface than is the second inclined portion.

Where the bottom surface of the specific coil element includes the second inclined portion, the magnetic head may further include a nonmagnetic section formed of a nonmagnetic material and lying on the flat portion of the top surface of the main pole. The nonmagnetic section has a top surface located at the front-side end of the nonmagnetic section in the direction of travel of the recording medium, and a front end face facing toward the medium facing surface and contiguous with the first inclined portion. In this case, the first step may further include the step of forming an initial nonmagnetic section on the magnetic layer, and the step of etching the initial nonmagnetic section so as to provide the initial nonmagnetic section with the front end face of the nonmagnetic section and thereby make the initial nonmagnetic section into the nonmagnetic section. Further, the coil underlayer may be formed to include a portion interposed between the front end face of the nonmagnetic section and the second inclined portion.

In the manufacturing method for the magnetic head of the present invention, the material used to form the coil underlayer may be different from that used to form the gap layer. In this case, in the step of etching the initial coil element and the initial coil underlayer, the initial coil underlayer may be etched using the gap layer as an etching stopper layer.

In the magnetic head of the present invention, the top surface of the main pole includes the first inclined portion. The specific coil element lies on the coil underlayer. The trailing shield includes a portion interposed between the front end face of the coil underlayer and the medium facing surface. The specific coil element has a front end face inclined with respect to the medium facing surface and the direction perpendicular to the medium facing surface. By virtue of such a configuration, the present invention makes it possible to prevent the occurrence of unwanted erasure induced by a skew, and shorten the length of the magnetic path passing through the trailing shield, the return path section and the main pole by reducing the distance between the medium facing surface and the end of the coil closest to the medium facing surface.

Further, in the magnetic head of the present invention, the bottom surface of the specific coil element includes the second inclined portion, and the front end face of the specific coil element is inclined at a greater angle with respect to the direction perpendicular to the medium facing surface than is the second inclined portion. The present invention thus allows for a further reduction in the distance between the medium facing surface and the end of the coil closest to the medium facing surface, thereby allowing for a further reduction in length of the magnetic path passing through the trailing shield, the return path section and the main pole.

According to the manufacturing method for the magnetic head of the present invention, the inclination angle and the location of the front end face of the specific coil element can be selected independently of the inclination angle and the location of the first inclined portion of the top surface of the main pole. Consequently, the manufacturing method of the present invention makes it possible to provide a magnetic head that provides the benefits described above and achieves reduced variations in write characteristics.

Other objects, features and advantages of the present invention will become fully apparent from the following description.

DETAILED DESCRIPTION OF THE PREFERRED EMBODIMENTS

First Embodiment

Figure 2:
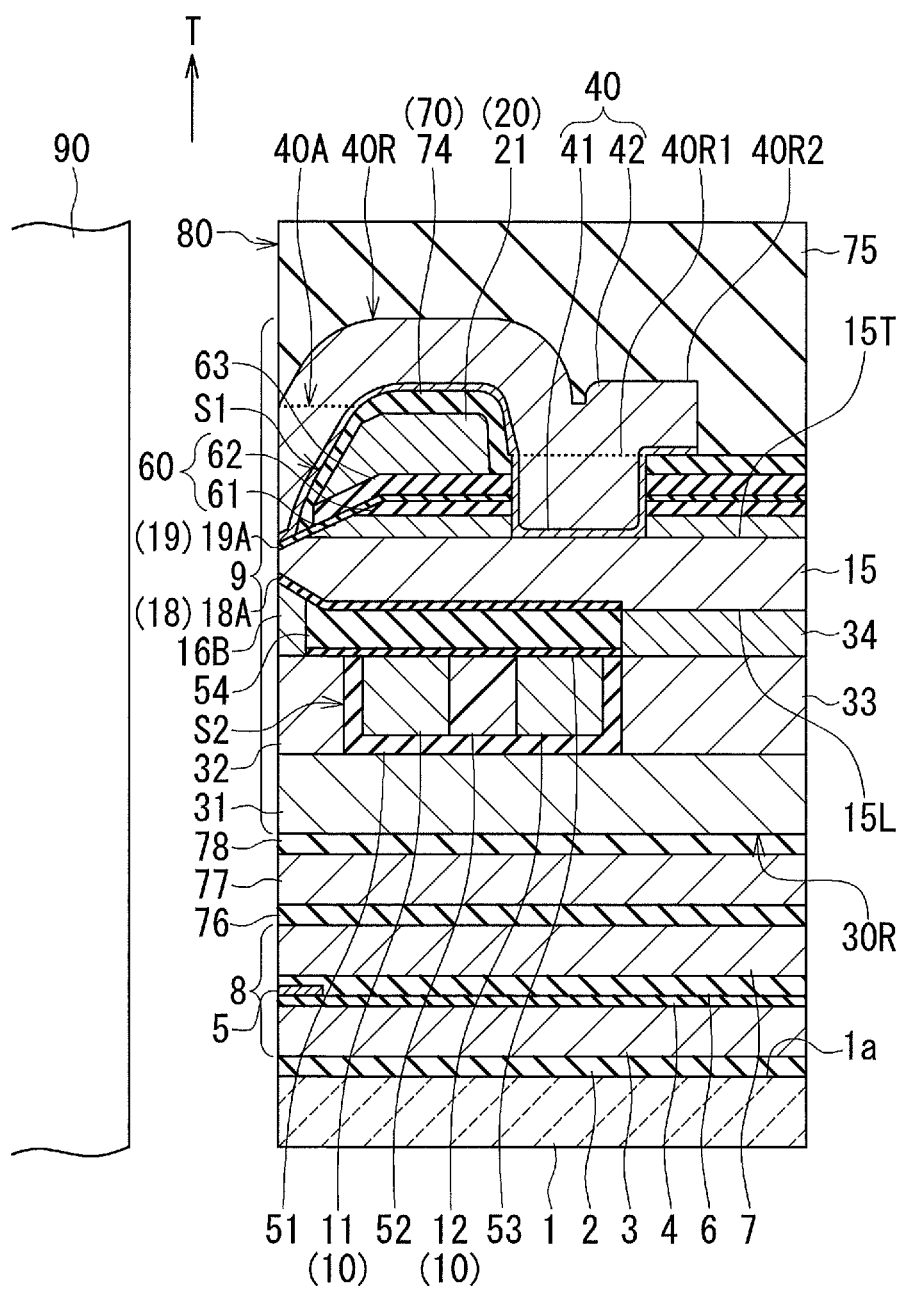
FIG. 2 is a cross-sectional view of the magnetic head according to the first embodiment of the invention.
Figure 3:
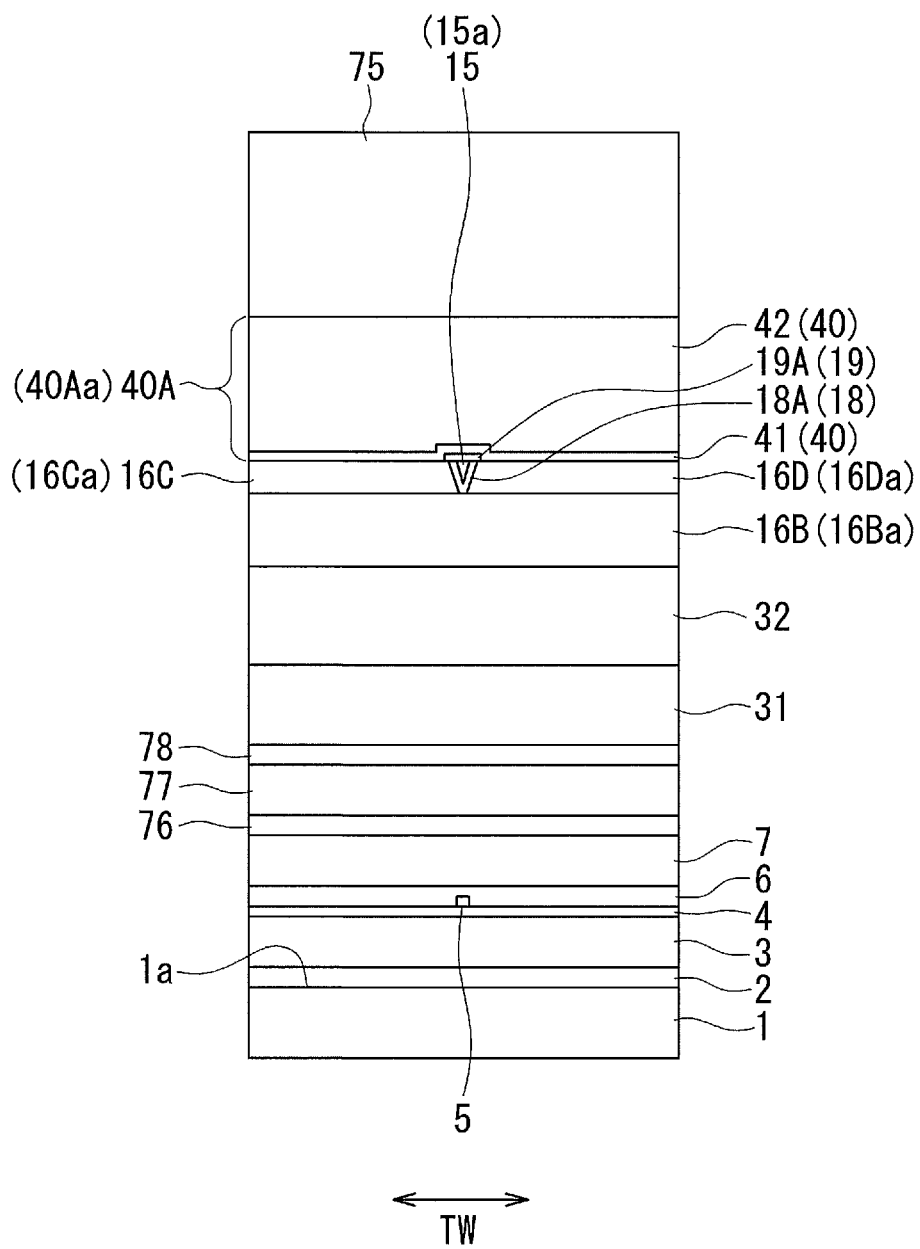
FIG. 3 is a front view showing the medium facing surface of the magnetic head according to the first embodiment of the invention.
Figure 4:
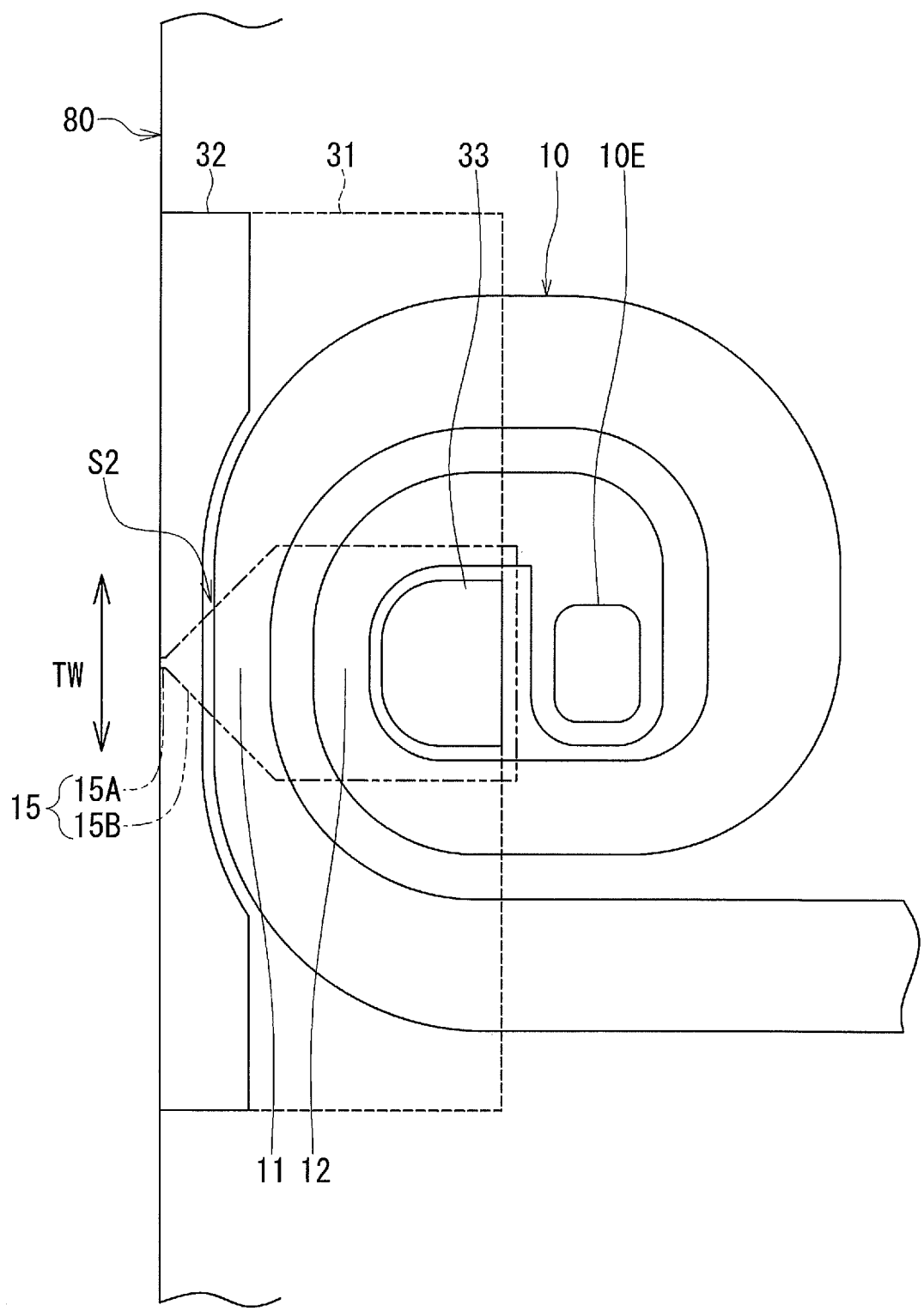
FIG. 4 is a plan view showing a second coil of the magnetic head according to the first embodiment of the invention.
Figure 5:
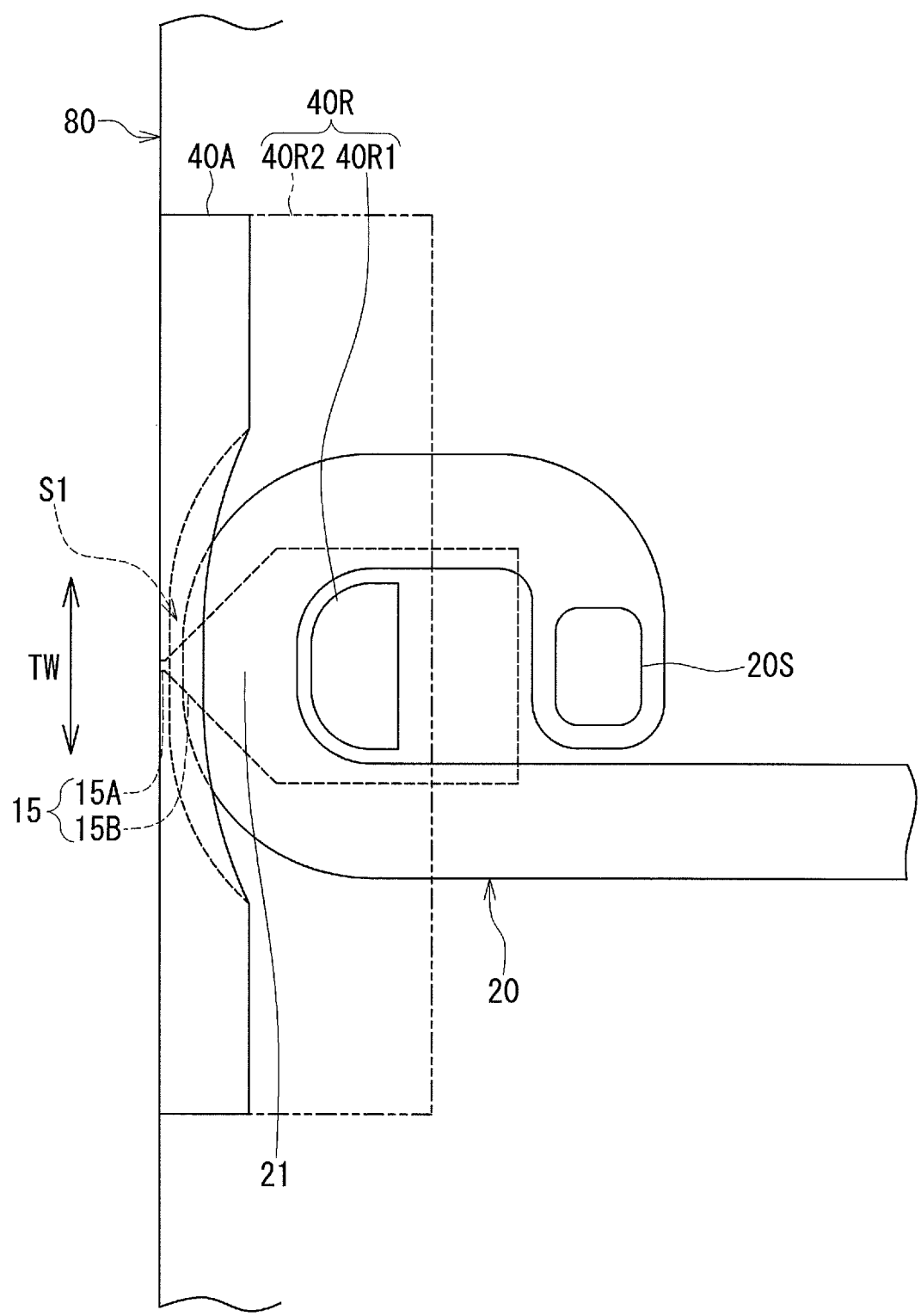
FIG. 5 is a plan view showing a first coil of the magnetic head according to the first embodiment of the invention.

Preferred embodiments of the present invention will now be described in detail with reference to the drawings. First, reference is made to FIG. 2 to FIG. 5 to describe the configuration of a magnetic head for perpendicular magnetic recording (hereinafter simply referred to as magnetic head) according to a first embodiment of the invention. FIG. 2 is a cross-sectional view of the magnetic head according to the present embodiment. The arrow labeled T in FIG. 2 indicates the direction of travel of a recording medium. FIG. 3 is a front view showing the medium facing surface of the magnetic head according to the present embodiment. FIG. 4 is a plan view showing a second coil of the magnetic head according to the present embodiment. FIG. 5 is a plan view showing a first coil of the magnetic head according to the present embodiment. The arrow labeled TW in FIGS. 3 to 5 indicates the track width direction.

The magnetic head according to the present embodiment is for use in, for example, a magnetic disk drive, and is incorporated in a slider configured to fly over the surface of a rotating recording medium 90. The slider has a medium facing surface 80 configured to face the recording medium 90. The medium facing surface 80 has an air inflow end (a leading end) and an air outflow end (a trailing end). An airflow that comes from the leading end into the space between the medium facing surface 80 and the recording medium 90 causes the slider to slightly fly over the surface of the recording medium 90.

Here, the side of the positions closer to the leading end relative to a reference position will be referred to as the leading side, and the side of the positions closer to the trailing end relative to the reference position will be referred to as the trailing side. The leading side is the rear side in the direction T of travel of the recording medium 90 relative to the slider. The trailing side is the front side in the direction T of travel of the recording medium 90 relative to the slider.

As shown in FIG. 2, the magnetic head has the medium facing surface 80 mentioned above. As shown in FIGS. 2 and 3, the magnetic head includes: a substrate 1 formed of a ceramic material such as aluminum oxide-titanium carbide ($Al_2O_3$—TiC) and having a top surface 1a; an insulating layer 2 formed of an insulating material such as alumina ($Al_2O_3$) and disposed on the top surface 1a of the substrate 1; a first read shield layer 3 formed of a magnetic material and disposed on the insulating layer 2; a first read shield gap film 4 which is an insulating film disposed to cover the first read shield layer 3; a magnetoresistive (MR) element 5 serving as a read element disposed on the first read shield gap film 4; a second read shield gap film 6 which is an insulating film disposed on the MR element 5; and a second read shield layer 7 formed of a magnetic material and disposed on the second read shield gap film 6.

An end of the MR element 5 is located in the medium facing surface 80. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of the layers constituting the GMR element.

The parts from the first read shield layer 3 to the second read shield layer 7 constitute a read head unit 8. The magnetic head further includes: a nonmagnetic layer 76 formed of a nonmagnetic material and disposed on the second read shield layer 7; a middle shield layer 77 formed of a magnetic material and disposed on the nonmagnetic layer 76; a nonmagnetic layer 78 formed of a nonmagnetic material and disposed on the middle shield layer 77; and a write head unit 9 disposed on the nonmagnetic layer 78. The middle shield layer 77 has the function of shielding the MR element 5 from magnetic fields generated in the write head unit 9. The nonmagnetic layers 76 and 78 are formed of alumina, for example.

The write head unit 9 includes a first coil 20, a second coil 10, a main pole 15, a trailing shield 40A, a leading shield 16B, two side shields 16C and 16D, a first gap section 19, and a second gap section 18. The first and second coils 20 and 10 produce magnetic fields corresponding to data to be written on the recording medium 90. Each of the first and second coils 20 and 10 is formed of a conductive material such as copper. The first coil 20 and the second coil 10 are connected in series or in parallel. The main pole 15 has an end face 15a located in the medium facing surface 80. The main pole 15 passes magnetic fluxes corresponding to the magnetic fields produced by the first and second coils 20 and 10, and produces a write magnetic field for use to write data on the recording medium 90 by means of a perpendicular magnetic recording system. FIG. 2 shows a cross section that intersects the end face 15a of the main pole 15 and that is perpendicular to the medium facing surface 80 and to the top surface 1a of the substrate 1. Such a cross section will hereinafter be referred to as the main cross section.

Each of the shields 40A, 16B, 16C and 16D is formed of a magnetic material. For example, one of CoFeN, CoNiFe, FeNi, and CoFe can be used as the material of the shields 16B, 16C and 16D. The material of the shield 40A will be described later.

The trailing shield 40A is located on the trailing side, i.e., the front side in the direction T of travel of the recording medium 90, relative to the main pole 15. The leading shield 16B is located on the leading side, i.e., the rear side in the direction T of travel of the recording medium 90, relative to the main pole 15. The two side shields 16C and 16D are located on opposite sides of the main pole 15 in the track width direction TW and magnetically couple the trailing shield 40A and the leading shield 16B to each other.

As shown in FIG. 3, the trailing shield 40A has an end face 40Aa located on the front side in the direction T of travel of the recording medium 90 relative to the end face 15a of the main pole 15. The leading shield 16B has an end face 16Ba located on the rear side in the direction T of travel of the recording medium 90 relative to the end face 15a of the main pole 15. The two side shields 16C and 16D have two end faces 16Ca and 16Da located on opposite sides of the end face 15a of the main pole 15 in the track width direction TW. In the medium facing surface 80, the end faces 40Aa, 16Ba, 16Ca and 16Da are arranged to surround the end face 15a of the main pole 15.

Each of the first and second gap sections 19 and 18 is formed of a nonmagnetic material. The first gap section 19 is located between the main pole 15 and the trailing shield 40A. The second gap section 18 is located between the main pole 15 and each of the leading shield 16B and the side shields 16C an 16D.

The write head unit 9 further includes a first return path section 40R and a second return path section 30R. Each of the first and second return path sections 40R and 30R is formed of a magnetic material. The first return path section 40R is located on the trailing side, i.e., the front side in the direction T of travel of the recording medium 90, relative to the main pole 15, and connects the trailing shield 40A and part of the main pole 15 located away from the medium facing surface 80 to each other, thereby magnetically coupling the trailing shield 40A and the main pole 15 to each other. The second return path section 30R is located on the leading side, i.e., the rear side in the direction T of travel of the recording medium 90, relative to the main pole 15, and connects the leading shield 16B and part of the main pole 15 located away from the medium facing surface 80 to each other, thereby magnetically coupling the leading shield 16B and the main pole 15 to each other.

The write head unit 9 further includes magnetic layers 31, 32, 33 and 34 constituting the second return path section 30R, each of the magnetic layers 31 to 34 being formed of a magnetic material. Examples of materials that can be used for the magnetic layers 31 to 34 include CoFeN, CoNiFe, FeNi, and CoFe. The magnetic layer 31 lies on the nonmagnetic layer 78. The magnetic layers 32 and 33 both lie on the magnetic layer 31. The magnetic layer 32 is located near the medium facing surface 80. The magnetic layer 33 is located farther from the medium facing surface 80 than is the magnetic layer 32. Each of the magnetic layers 31 and 32 has an end face located in the medium facing surface 80.

As shown in FIG. 4, the second coil 10 is wound around the magnetic layer 33. The write head unit 9 further includes: a first insulating layer (not illustrated) formed of an insulating material, lying on the nonmagnetic layer 78 and surrounding the magnetic layer 31; an insulating film 51 formed of an insulating material and separating the second coil 10 from the magnetic layers 31 to 33; an insulating layer 52 formed of an insulating material and disposed in the space between adjacent turns of the second coil 10; and a second insulating layer (not illustrated) formed of an insulating material and disposed around the second coil 10 and the magnetic layer 32. The top surfaces of the second coil 10, the magnetic layers 32 and 33, the insulating film 51, the insulating layer 52 and the second insulating layer are even with each other. The insulating film 51, the first insulating layer and the second insulating layer are formed of alumina, for example. The insulating layer 52 is formed of a photoresist, for example.

The leading shield 16B lies on the magnetic layer 32. The magnetic layer 34 lies on the magnetic layer 33. The write head unit 9 further includes an insulating layer 53 formed of an insulating material, and a nonmagnetic layer 54 formed of a nonmagnetic material. The insulating layer 53 lies over the top surfaces of the second coil 10, the insulating film 51, the insulating layer 52 and the second insulating layer, and a portion of the top surface of the magnetic layer 32. The nonmagnetic layer 54 lies on the insulating layer 53 and surrounds the leading shield 16B and the magnetic layer 34. The insulating layer 53 and the nonmagnetic layer 54 are formed of alumina, for example.

The side shields 16C and 16D are disposed on the leading shield 16B. The main pole 15 has: the end face 15a; a top surface 15T (see FIG. 2) located at the trailing-side end of the main pole 15, i.e., the front-side end of the main pole 15 in the direction T of travel of the recording medium 90; a bottom end 15L (see FIG. 2) opposite to the top surface 15T; and a first side portion and a second side portion (see FIG. 3) opposite to each other in the track width direction TW. The side shield 16C has a first sidewall opposed to the first side portion of the main pole 15. The side shield 16D has a second sidewall opposed to the second side portion of the main pole 15.

The write head unit 9 further includes a second gap layer 18A formed of a nonmagnetic material and including a portion that constitutes the second gap section 18. The portion of the second gap layer 18A constituting the second gap section 18 is located between the main pole 15 and each of the leading shield 16B and the side shields 16C and 16D.

The second gap layer 18A is disposed to extend along the first and second sidewalls of the side shields 16C and 16D, the top surface of the leading shield 16B and the top surface of the nonmagnetic layer 54. The nonmagnetic material used to form the second gap layer 18A may be an insulating material or a nonmagnetic metal material. Alumina is an example of an insulating material that can be used to form the second gap layer 18A. Ru is an example of a nonmagnetic metal material that can be used to form the second gap layer 18A.

A portion of the main pole 15 lies above the top surfaces of the leading shield 16B and the nonmagnetic layer 54. The second gap layer 18A is interposed between the portion of the main pole 15 and the top surfaces of the leading shield 16B and the nonmagnetic layer 54. As shown in FIG. 3, the second gap layer 18A is interposed also between the first side portion of the main pole 15 and the first sidewall of the side shield 16C, and between the second side portion of the main pole 15 and the second sidewall of the side shield 16D.

The bottom end 15L of the main pole 15 is in contact with the top surface of the magnetic layer 34 at a location away from the medium facing surface 80. The main pole 15 is formed of a ferromagnetic material containing one or more elements selected from the group consisting of Ni, Fe and Co, such as FeNi, CoNiFe, or CoFe. The shape of the main pole 15 will be described in detail later.

The write head unit 9 further includes a nonmagnetic layer (not illustrated) formed of a nonmagnetic material and disposed around the main pole 15 and the side shields 16C and 16D. The non-illustrated nonmagnetic layer is formed of alumina, for example.

The write head unit 9 further includes a nonmagnetic section 60 formed of nonmagnetic material and lying on the top surface 15T of the main pole 15. The nonmagnetic section 60 includes a first nonmagnetic layer 61 and a second nonmagnetic layer 62. The first nonmagnetic layer 61 lies on a portion of the top surface 15T of the main pole 15 at a location away from the medium facing surface 80. The second nonmagnetic layer 62 lies on the top surface of the first nonmagnetic layer 61. The first nonmagnetic layer 61 is formed of a nonmagnetic metal material such as Ru, NiCr or NiCu. The second nonmagnetic layer 62 is formed of a nonmagnetic insulating material such as alumina.

The write head unit 9 further includes a first gap layer 19A formed of a nonmagnetic material and including a portion that constitutes at least part of the first gap section 19. The first gap layer 19A is disposed to cover the main pole 15, the first nonmagnetic layer 61 and the second nonmagnetic layer 62. The first gap layer 19A is formed of $SiO_2$, for example.

The write head unit 9 further includes a coil underlayer 63 formed of a nonmagnetic material. The coil underlayer 63 lies on the first gap layer 19A at a location away from the medium facing surface 80. The coil underlayer 63 has a thickness in the range of 30 to 100 nm, for example. At least part of the first coil 20 lies on the coil underlayer 63. The coil underlayer 63 may be formed of a material different from that used to form the first gap layer 19A. For example, where the material used to form the first gap layer 19A is $SiO_2$, alumina is selected as the material for forming the coil underlayer 63.

The write head unit 9 further includes an insulating section 70 formed of an insulating material. The insulating section 70 lies on the first gap layer 19A, the first coil 20 and the coil underlayer 63 so as to cover the first coil 20 and the coil underlayer 63. The insulating section 70 includes an insulating film 74 as its main portion. The insulating film 74 is formed of alumina, for example. The first gap layer 19A, the first nonmagnetic layer 61, the second nonmagnetic layer 62, the coil underlayer 63 and the insulating film 74 have openings for exposing a portion of the top surface 15T of the main pole 15 located away from the medium facing surface 80.

The write head unit 9 further includes a magnetic layer 40 formed of magnetic material and constituting the trailing shield 40A and the first return path section 40R. The magnetic layer 40 lies on the main pole 15, the side shields 16C and 16D, the first gap layer 19A and the insulating film 74 so as to connect the top surfaces of the side shields 16C and 16D to the portion of the top surface 15T of the main pole 15 located away from the medium facing surface 80. The magnetic layer 40 includes an electrode film 41 and a magnetic layer body 42 lying on the electrode film 41. The electrode film 41 is used as an electrode and a seed when forming the magnetic layer body 42 by plating. The electrode film 41 and the magnetic layer body 42 may be formed of different magnetic materials, and the magnetic material used to form the electrode film 41 may have a saturation flux density higher than that of the magnetic material used to form the magnetic layer body 42. For example, the magnetic material used to form the electrode film 41 may be CoNiFe or CoFe having a saturation flux density of approximately 2.4 T, and the magnetic material used to form the magnetic layer body 42 may be FeNi having a saturation flux density of approximately 1.9 T.

The magnetic layer 40 has an end face located in the medium facing surface 80. The trailing shield 40A is constituted by a portion of the magnetic layer 40 near the medium facing surface 80, the portion including the end face of the magnetic layer 40. The end face of the magnetic layer 40 also serves as the end face 40Aa of the trailing shield 40A. The first return path section 40R is constituted by the remainder of the magnetic layer 40. In FIG. 2, the boundary between the trailing shield 40A and the first return path section 40R is indicated by a dotted line.

The trailing shield 40A lies on the side shields 16C and 16D and the first gap layer 19A. The portion of the first gap layer 19A constituting at least part of the first gap section 19 is located between the main pole 15 and the trailing shield 40A.

The first return path section 40R includes a coupling portion 40R1 and a yoke portion 40R2. The coupling portion 40R1 lies on the top surface 15T of the main pole 15 at a location away from the medium facing surface 80. The yoke portion 40R2 couples the trailing shield 40A and the coupling portion 40R1 to each other. In FIG. 2, the boundary between the coupling portion 40R1 and the yoke portion 40R2 is indicated by a dotted line.

The magnetic head further includes a protective layer 75 formed of a nonmagnetic material and disposed to cover the write head unit 9. The protective layer 75 is formed of, for example, an inorganic insulating material such as alumina.

As has been described, the magnetic head according to the present embodiment includes the medium facing surface 80, the read head unit 8, and the write head unit 9. The read head unit 8 and the write head unit 9 are stacked on the substrate 1. The write head unit 9 is located on the front side in the direction T of travel of the recording medium 90 relative to the read head unit 8.

The write head unit 9 includes the first and second coils 20 and 10, the main pole 15, the trailing shield 40A, the leading shield 16B, the two side shields 16C and 16D, the first and second gap sections 19 and 18, the first and second return path sections 40R and 30R, the nonmagnetic section 60, and the coil underlayer 63.

The trailing shield 40A and the first return path section 40R are each constituted by the magnetic layer 40. The first return path section 40R is located on the trailing side, i.e., the front side in the direction T of travel of the recording medium 90 relative to the main pole 15, and connects the trailing shield 40A and part of the main pole 15 located away from the medium facing surface 80 to each other so that a first space S1 is defined by the main pole 15, the first gap section 19, the trailing shield 40A and the first return path section 40R. The first coil 20 passes through the first space S1.

The second return path section 30R is constituted by the magnetic layers 31 to 34. The second return path section 30R is located on the leading side, i.e., the rear side in the direction T of travel of the recording medium 90 relative to the main pole 15, and connects the leading shield 16B and part of the main pole 15 located away from the medium facing surface 80 to each other so that a second space S2 is defined by the main pole 15, the second gap section 18, the leading shield 16B and the second return path section 30R (the magnetic layers 31 to 34). The second coil 10 passes through the second space S2.

The shields 40A, 16B, 16C and 16D capture a disturbance magnetic field applied to the magnetic head from the outside thereof. This makes it possible to prevent the disturbance magnetic field from being intensively captured into the main pole 15 and thereby causing erroneous writing on the recording medium 90. The shields 40A, 16B, 16C and 16D also have the function of capturing a magnetic flux that is produced from the end face 15a of the main pole 15 and spreads in directions other than the direction perpendicular to the plane of the recording medium 90, and thereby preventing the magnetic flux from reaching the recording medium 90. Furthermore, the shields 40A, 16B, 16C and 16D and the first and second return path sections 40R and 30R have the function of allowing a magnetic flux that has been produced from the end face 15a of the main pole 15 and has magnetized a portion of the recording medium 90 to flow back.

Reference is now made to FIGS. 2, 4 and 5 to describe the configurations of the first and second coils 20 and 10. As shown in FIG. 4, the second coil 10 is wound approximately twice around the magnetic layer 33. The second coil 10 includes at least one second coil element extending to pass through the second space S2. A coil element refers to a portion of the winding of a coil. In the present embodiment, the second coil 10 includes two second coil elements 11 and 12 extending in a direction intersecting the direction perpendicular to the medium facing surface 80 to pass through the second space S2, particularly through between the magnetic layer 32 and the magnetic layer 33. The second coil elements 11 and 12 are adjacent to each other in the direction perpendicular to the medium facing surface 80, the coil element 11 being located closer to the medium facing surface 80 than the coil element 12. The second coil 10 has a coil connection 10E electrically connected to the first coil 20.

As shown in FIG. 5, the first coil 20 is wound approximately once around the coupling portion 40R1 of the first return path section 40R. The first coil 20 includes at least one first coil element extending to pass through the first space S1. In the present embodiment, the first coil 20 includes a first coil element 21 extending in the direction intersecting the direction perpendicular to the medium facing surface 80 to pass through the first space S1, particularly through between the trailing shield 40A and the coupling portion 40R1 of the first return path section 40R. As shown in FIG. 2, the second coil elements 11 and 12 are located such that the main pole 15 is interposed between the first coil element 21 and the second coil elements 11, 12.

The first coil 20 has a coil connection 20S electrically connected to the coil connection 10E of the second coil 10. The coil connection 20S is electrically connected to the coil connection 10E via first and second connection layers of columnar shape (not illustrated) that penetrate a plurality of layers interposed between the first coil 20 and the second coil 10. The first connection layer and the second connection layer are stacked in this order on the coil connection 10E. The coil connection 20S lies on the second connection layer. The first and second connection layers are each formed of a conductive material such as copper. In the example shown in FIGS. 4 and 5, the first coil 20 and the second coil 10 are connected in series.

Figure 1:
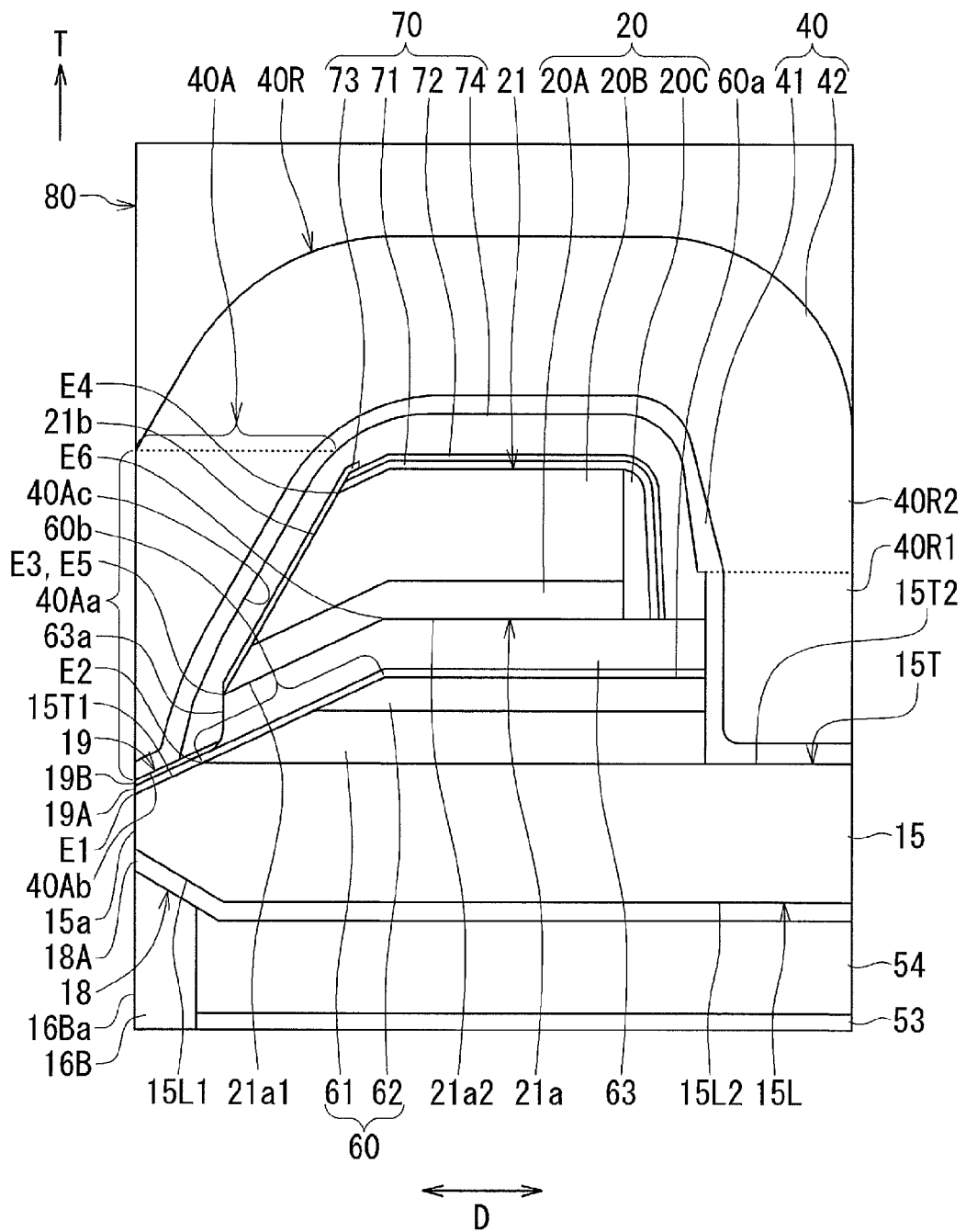
FIG. 1 is a cross-sectional view showing the main part of a magnetic head according to a first embodiment of the invention.

The configuration of the magnetic head according to the present embodiment will now be described in more detail. First, the shape of the main pole 15 will be described in detail with reference to FIG. 1 and FIGS. 3 to 5. FIG. 1 is a cross-sectional view showing the main part of the magnetic head according to the present embodiment. FIG. 1 shows the main cross section. As shown in FIGS. 4 and 5, the main pole 15 includes a track width defining portion 15A and a wide portion 15B. The track width defining portion 15A has the end face 15a and an end opposite to the end face 15a. The wide portion 15B is connected to the end of the track width defining portion 15A. The main pole 15 has the top surface 15T, the bottom end 15L, the first side portion and the second side portion. The width of the top surface 15T in the track width direction TW is greater in the wide portion 15B than in the track width defining portion 15A.

In the track width defining portion 15A, the width of the top surface 15T in the track width direction TW is generally constant regardless of distance from the medium facing surface 80. In the wide portion 15B, the width of the top surface 15T in the track width direction TW is, for example, equal to that in the track width defining portion 15A at the boundary between the track width defining portion 15A and the wide portion 15B, and gradually increases with increasing distance from the medium facing surface 80, then becoming constant. The length of the track width defining portion 15A in the direction perpendicular to the medium facing surface 80 will be referred to as the neck height. The neck height falls within the range of 0 to 0.3 µm, for example. A zero neck height means that the track width defining portion 15A is not present and the wide portion 15B thus has the end face 15a.

As shown in FIG. 1, the top surface 15T includes a first inclined portion 15T1 and a flat portion 15T2, the first inclined portion 15T1 being located closer to the medium facing surface 80 than the flat portion 15T2. The first inclined portion 15T1 has a first end E1 located in the medium facing surface 80 and a second end E2 opposite to the first end E1. The flat portion 15T2 is connected to the second end E2 of the first inclined portion 15T1.

The first inclined portion 15T1 is inclined with respect to the medium facing surface 80 and the direction perpendicular to the medium facing surface 80 such that the second end E2 is located on the front side in the direction T of travel of the recording medium 90 relative to the first end E1. In FIG. 1, the arrow labeled D indicates the direction perpendicular to the medium facing surface 80. The flat portion 15T2 extends substantially in the direction D perpendicular to the medium facing surface 80.

As shown in FIG. 1, the bottom end 15L includes an inclined portion 15L1 and a flat portion 15L2, the inclined portion 15L1 being located closer to the medium facing surface 80 than the flat portion 15L2. The inclined portion 15L1 has a first end located in the medium facing surface 80 and a second end opposite to the first end. The inclined portion 15L1 may be an edge formed by two intersecting planes, or may be a plane connecting two planes to each other. The flat portion 15L2 is a plane connected to the second end of the inclined portion 15L1. The inclined portion 15L1 is inclined with respect to the medium facing surface 80 and the direction D perpendicular to the medium facing surface 80 such that its second end is located on the rear side in the direction T of travel of the recording medium 90 relative to its first end. The flat portion 15L2 extends substantially in the direction D perpendicular to the medium facing surface 80.

As shown in FIG. 3, the end face 15a of the main pole 15 has a first side in contact with the first gap layer 19A, a second side connected to one end of the first side, and a third side connected to the other end of the first side. The first side defines the track width. The position of an end of a record bit to be recorded on the recording medium 90 is determined by the position of the first side. The width in the track width direction TW of the end face 15a of the main pole 15 located in the medium facing surface 80 decreases with increasing distance from the first side, that is, with decreasing distance to the top surface 1a of the substrate 1. Each of the second side and the third side forms an angle of, for example, 7° to 17°, or preferably 10° to 15°, with respect to the direction perpendicular to the top surface 1a of the substrate 1. The first side has a length in the range of 0.05 to 0.20 µm, for example.

The first coil 20 and the first coil element 21 will now be described in detail with reference to FIG. 1. As shown in FIG. 1, the first coil 20 includes an electrode film 20A lying on the coil underlayer 63, a conductive layer 20B lying on the electrode film 20A, and a deposition film 20C. The electrode film 20A is used as an electrode and a seed when forming the conductive layer 20B by plating. The electrode film 20A has a thickness in the range of 50 to 100 nm, for example. The deposition film 20C is formed by deposition of part of flying substances onto the sidewalls of the electrode film 20A and the conductive layer 20B, the flying substances having been generated by etching of the electrode film 20A in the step of etching the electrode film 20A performed after the formation of the conductive layer 20B.

The first coil 20 includes at least one first coil element. The at least one first coil element includes a specific coil element. In the present embodiment, the first coil 20 includes one first coil element 21, and the first coil element 21 is the specific coil element. As shown in FIG. 1, the specific coil element 21 has a bottom surface 21a facing toward the top surface 15T of the main pole 15, and a front end face 21b facing toward the medium facing surface 80. The front end face 21b of the specific coil element 21 has a third end E3 closest to the main pole 15, and a fourth end E4 opposite to the third end E3. The front end face 21b of the specific coil element 21 is inclined with respect to the medium facing surface 80 and the direction D perpendicular to the medium facing surface 80 such that the fourth end E4 is located at a greater distance from the medium facing surface 80 than is the third end E3. In the present embodiment, as shown in FIG. 1, the front end face 21b of the specific coil element 21 is inclined at a greater angle with respect to the direction D perpendicular to the medium facing surface 80 than is the first inclined portion 15T1.

As shown in FIG. 1, the bottom surface 21a of the specific coil element 21 includes a second inclined portion 21a1. The second inclined portion 21a1 has a fifth end E5 closest to the medium facing surface 80, and a sixth end E6 opposite to the fifth end E5. The fifth end E5 coincides with the third end E3 of the front end face 21b of the specific coil element 21. The second inclined portion 21a1 is inclined with respect to the medium facing surface 80 and the direction D perpendicular to the medium facing surface 80 such that the sixth end E6 is located on the trailing side, i.e., the front side in the direction T of travel of the recording medium 90, relative to the fifth end E5. The front end face 21b of the specific coil element 21 is inclined at a greater angle with respect to the direction D perpendicular to the medium facing surface 80 than is the second inclined portion 21a1.

In the example shown in FIG. 1, the bottom surface 21a of the specific coil element 21 further includes a flat portion 21a2 connected to the sixth end E6 of the second inclined portion 21a1. The flat portion 21a2 of the bottom surface 21a of the specific coil element 21 extends substantially in the direction D perpendicular to the medium facing surface 80.

The coil underlayer 63, the nonmagnetic section 60, the first gap section 19, the insulating section 70, and the trailing shield 40A will now be described in detail. As shown in FIG. 1, the coil underlayer 63 lies under at least the specific coil element 21 of the first coil 20, and has a front end face 63a facing toward the medium facing surface 80. The trailing shield 40A includes a portion interposed between the front end face 63a of the coil underlayer 63 and the medium facing surface 80.

As shown in FIG. 1, the nonmagnetic section 60 lies on the flat portion 15T2 of the top surface 15T of the main pole 15. The nonmagnetic section 60 has a top surface 60a and a front end face 60b. The top surface 60a is located at the trailing-side end of the nonmagnetic section 60, that is, the front-side end of the nonmagnetic section 60 in the direction T of travel of the recording medium 90. The front end face 60b faces toward the medium facing surface 80 and is contiguous with the first inclined portion 15T1. In the present embodiment, the top surface 60a of the nonmagnetic section 60 is constituted by the top surface of the second nonmagnetic layer 62. The front end face 60b of the nonmagnetic section 60 is constituted by the end face of the first nonmagnetic layer 61 facing toward the medium facing surface 80 and the end face of the second nonmagnetic layer 62 facing toward the medium facing surface 80. The coil underlayer 63 includes a portion interposed between the front end face 60b of the nonmagnetic section 60 and the second inclined portion 21a1.

As shown in FIG. 1, the magnetic head includes a third gap layer 19B formed of a nonmagnetic material and interposed between the first gap layer 19A and the trailing shield 40A. The third gap layer 19B has an end located in the medium facing surface 80. In the present embodiment, the first gap section 19 is constituted by a portion of the first gap layer 19A and a portion of the third gap layer 19B. The third gap layer 19B is formed of alumina, for example.

In the medium facing surface 80, the end face 40Aa of the trailing shield 40A is located at a predetermined distance from the end face 15a of the main pole 15. To make full use of the function of the trailing shield 40A, it is preferred that the distance between the end face 15a of the main pole 15 and the end face 40Aa of the trailing shield 40A in the medium facing surface 80, which will hereinafter be called gap length, be relatively small. The gap length is determined by the thickness of the first gap section 19, that is, the total thickness of the first and third gap layers 19A and 19B, in the medium facing surface 80. The gap length falls within the range of, for example, 5 to 60 nm, and preferably within the range of 30 to 60 nm.

As shown in FIG. 1, the insulating section 70 includes not only the insulating film 74 but also insulating films 71, 72 and 73. The insulating films 71 to 73 are all interposed between the first coil element 21 and the insulating film 74. The insulating film 71 covers the outer surface of the first coil element 21 excluding the bottom surface 21a and the front end face 21b. The insulating film 72 covers the insulating film 71. The insulating film 73 covers the front end face 21b of the first coil element 21. The insulating film 71 is formed of alumina, for example. The insulating film 72 is formed of $SiO_2$, for example.

The insulating film 73 may be formed of a material different from that used to form the first gap layer 19A. For example, where the material used to form the first gap layer 19A is $SiO_2$, alumina is selected as the material for forming the insulating film 73.

The trailing shield 40A has a bottom surface 40Ab and a rear end face 40Ac in addition to the end face 40Aa, the bottom surface 40Ab facing toward the main pole 15, the rear end face 40Ac being opposite to the end face 40Aa. The bottom surface 40Ab of the trailing shield 40A is opposed to the first inclined portion 15T1 of the top surface 15T of the main pole 15 with the first gap section 19 interposed therebetween. A portion of the rear end face 40Ac of the trailing shield 40A is opposed to the front end face 21b with the insulating films 73 and 74 interposed therebetween. This portion of the rear end face 40Ac is inclined with respect to the medium facing surface 80 and the direction D perpendicular to the medium facing surface 80 in such a manner as to become parallel or almost parallel to the front end face 21b of the specific coil element 21. The specific coil element 21 includes a portion interposed between the top surface 15T of the main pole 15 and the rear end face 40Ac of the trailing shield 40A.

The specific function and effects of the magnetic head according to the present embodiment will now be described. In the magnetic head according to the present embodiment, the top surface 15T of the main pole 15 includes the first inclined portion 15T1, and the bottom end 15L of the main pole 15 includes the inclined portion 15L1. This allows the thickness of a portion of the main pole 15 near the medium facing surface 80 to decrease toward the medium facing surface 80. Consequently, the present embodiment is able to prevent the occurrence of unwanted erasure induced by a skew. On the other hand, a portion of the main pole 15 located away from the medium facing surface 80 can have a large thickness, so that the main pole 15 can guide much magnetic flux to the medium facing surface 80. This makes it possible to enhance write characteristics, such as overwrite property.

In the present embodiment, the specific coil element 21 lies on the coil underlayer 63. The specific coil element 21 has the front end face 21b. The trailing shield 40A includes the portion interposed between the front end face 63a of the coil underlayer 63 and the medium facing surface 80. The specific coil element 21 includes the portion interposed between the top surface 15T of the main pole 15 and the rear end face 40Ac of the trailing shield 40A. Such a configuration of the present embodiment provides the following first and second advantages. The first advantage is that it is possible to reduce the distance between the medium facing surface 80 and the end of the first coil 20 closest to the medium facing surface 80, that is, the third end E3 of the specific coil element 21. This allows for a reduction in length of the magnetic path passing through the trailing shield 40A, the first return path section 40R and the main pole 15. The second advantage is that it is possible to reduce the area of the region in which the top surface 15T of the main pole 15 and the outer surface of the trailing shield 40A are opposed to each other, thereby making it possible to prevent leakage of magnetic flux from the main pole 15 to the trailing shield 40A. Consequently, it becomes possible to prevent degradation in write characteristics resulting from leakage of magnetic flux from the main pole 15 to the trailing shield 40A.

Further, in the present embodiment, the bottom surface 21a of the specific coil element 21 includes the second inclined portion 21a1, and the front end face 21b of the specific coil element 21 is inclined at a greater angle with respect to the direction D perpendicular to the medium facing surface 80 than is the second inclined portion 21a1. Such a configuration allows the specific coil element 21 to include a wedge-shaped portion located between the front end face 21b and the second inclined portion 21a1 and having a tip inclined to approach the main pole 15. The present embodiment makes it possible that the end of the first coil 20 closest to the medium facing surface 80, that is, the third end E3 of the specific coil element 21, is located at a smaller distance from each of the medium facing surface 80 and the main pole 15 than in the case where the specific coil element 21 does not include the aforementioned wedge-shaped portion. Consequently, the present embodiment allows for a further reduction in length of the magnetic path passing through the trailing shield 40A, the first return path section 40R and the main pole 15.

Further, in the present embodiment, the nonmagnetic section 60 is provided on the top surface 15T of the main pole 15. The nonmagnetic section 60 has the front end face 60b facing toward the medium facing surface 80 and contiguous with the first inclined portion 15T1. The coil underlayer 63 includes the portion interposed between the front end face 60b of the nonmagnetic section 60 and the second inclined portion 21a1 of the bottom surface 21a of the specific coil element 21. The provision of the nonmagnetic section 60 in the present embodiment allows for easy formation of the aforementioned wedge-shaped portion of the specific coil element 21.

A method of manufacturing the magnetic head according to the present embodiment will now be described. As shown in FIGS. 2 and 3, the method of manufacturing the magnetic head according to the present embodiment first forms the insulating layer 2, the first read shield layer 3 and the first read shield gap film 4 in this order on the substrate 1. Then, the MR element 5 and leads (not illustrated) connected to the MR element 5 are formed on the first read shield gap film 4. The MR element 5 and the leads are then covered with the second read shield gap film 6. Next, the second read shield layer 7, the nonmagnetic layer 76, the middle shield layer 77 and the nonmagnetic layer 78 are formed in this order on the second read shield gap film 6.

Next, the magnetic layer 31 is formed on the nonmagnetic layer 78 by frame plating, for example. Then, the first insulating layer (not illustrated) is formed over the entire top surface of the stack. The first insulating layer is then polished by, for example, chemical mechanical polishing (hereinafter referred to as CMP), until the magnetic layer 31 is exposed. The magnetic layers 32 and 33 are then formed on the magnetic layer 31 by frame plating, for example. The insulating film 51 is then formed over the entire top surface of the stack. The second coil 10 is then formed by frame plating, for example. The insulating layer 52 is then formed in the space between adjacent turns of the second coil 10. Next, the second insulating layer (not illustrated) is formed over the entire top surface of the stack. The insulating film 51 and the second insulating layer are then polished by, for example, CMP, until the second coil 10, the magnetic layers 32 and 33 and the insulating layer 52 are exposed.

Then, the insulating layer 53 is formed over the entire top surface of the stack. The insulating layer 53 is then selectively etched to form therein a first opening for exposing the top surface of the magnetic layer 32, a second opening for exposing the top surface of the magnetic layer 33, and a third opening for exposing the coil connection 10E (see FIG. 4) of the second coil 10. Then, an initial leading shield, which will later become the leading shield 16B, is formed on the magnetic layer 32 at the location of the first opening, the magnetic layer 34 is formed on the magnetic layer 33 at the location of the second opening, and the first connection layer (not illustrated) is formed on the coil connection 10E at the location of the third opening, by frame plating, for example. Next, the nonmagnetic layer 54 is formed over the entire top surface of the stack. The nonmagnetic layer 54 is then polished by, for example, CMP, until the initial leading shield, the magnetic layer 34 and the first connection layer are exposed.

Next, the initial leading shield and the nonmagnetic layer 54 are taper-etched in part by, for example, ion beam etching (hereinafter referred to as IBE) so that the top surface of the initial leading shield is provided with a portion to be opposed to the inclined portion 15L1 (see FIG. 1) of the bottom end 15L of the main pole 15 to be formed later. This makes the initial leading shield into the leading shield 16B. This etching also etches the magnetic layer 34 and the first connection layer in part.

Next, the side shields 16C and 16D are formed on the leading shield 16B by frame plating, for example. The second gap layer 18A is then formed to cover the leading shield 16B and the side shields 16C and 16D. Where alumina is selected as the material of the second gap layer 18A, the second gap layer 18A is formed by atomic layer deposition, for example. Where Ru is selected as the material of the second gap layer 18A, the second gap layer 18A is formed by chemical vapor deposition, for example. Next, the second gap layer 18A is selectively etched to form therein an opening for exposing the top surface of the magnetic layer 34 and an opening for exposing the top surface of the first connection layer.

Next, a magnetic layer that will later become the main pole 15, and the second connection layer (not illustrated) are formed by frame plating, for example. The magnetic layer and the second connection layer are formed such that their top surfaces are higher in level than portions of the second gap layer 18A lying on the side shields 16C and 16D. Next, the nonmagnetic layer (not illustrated) is formed over the entire top surface of the stack. The magnetic layer, the second connection layer, the second gap layer 18A and the non-illustrated nonmagnetic layer are then polished by, for example, CMP, until the side shields 16C and 16D are exposed.

Reference is now made to FIG. 6 to FIG. 14 to describe a series of steps to be performed after the foregoing step up to the formation of the magnetic layer 40. FIGS. 6 to 14 each illustrate a stack of layers formed in the process of manufacturing the magnetic head. FIGS. 6 to 14 show a cross section perpendicular to the medium facing surface 80 and to the top surface 1a of the substrate 1, particularly the main cross section. FIGS. 6 to 14 omit the illustration of portions located below the leading shield 16B and the insulating layer 53.

Figure 6:
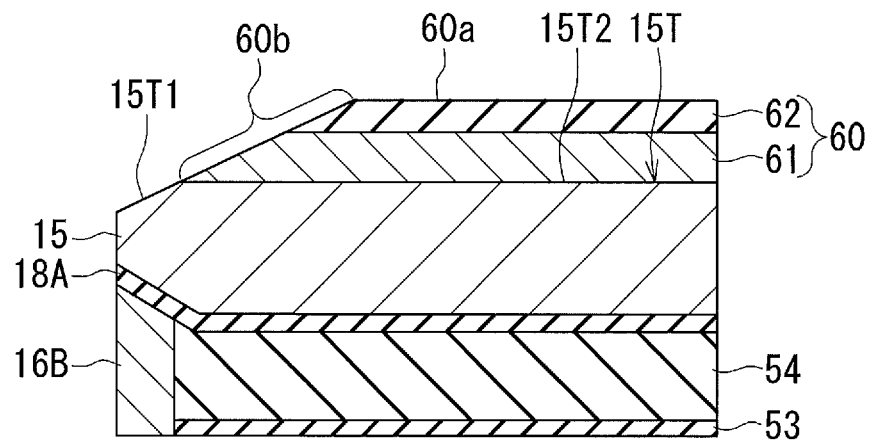
FIG. 6 is a cross-sectional view showing a step of a method of manufacturing the magnetic head according to the first embodiment of the invention.

In the step shown in FIG. 6, first, an initial nonmagnetic section is formed on the magnetic layer that will become the main pole 15. The initial nonmagnetic section includes a first mask layer and a second mask layer that will later become the first nonmagnetic layer 61 and the second nonmagnetic layer 62, respectively. The first and second mask layers are formed by sputtering, for example. Then, a photoresist mask (not illustrated) is formed on the initial nonmagnetic section. The photoresist mask is formed by patterning a photoresist layer. Other photoresist masks to be used in later steps will be formed in the same manner as the aforementioned photoresist mask. Next, the second mask layer is etched by, for example, reactive ion etching (hereinafter referred to as RIE), using the photoresist mask as an etching mask. This etching is performed under such conditions that the material used to form the first mask layer (the first nonmagnetic layer 61) is not etched at all or is hardly etched whereas the material used to to form the second mask layer (the second nonmagnetic layer 62) is selectively etched. This etching makes the second mask layer into the second nonmagnetic layer 62. The photoresist mask is then removed.

The aforementioned magnetic layer, the side shields 16C and 16D, the first mask layer and the non-illustrated nonmagnetic layer are then etched in part by, for example, IBE, using the second nonmagnetic layer 62 as an etching mask. This etching makes the magnetic layer into the main pole 15. This etching also makes the first mask layer into the first nonmagnetic layer 61, thereby making the initial nonmagnetic section into the nonmagnetic section 60.

Where IBE is employed to etch the aforementioned magnetic layer, the side shields 16C and 16D, the first mask layer and the non-illustrated nonmagnetic layer in part, the ion beams are allowed to travel in a direction at an angle of 40° to 75° with respect to the direction perpendicular to the top surface 1a (see FIGS. 2 and 3) of the substrate 1, and the direction of travel of the ion beams is caused to rotate as viewed in the direction perpendicular to the top surface 1a of the substrate 1. Performing IBE in such a manner provides the aforementioned magnetic layer with the first inclined portion 15T1 and the flat portion 15T2, and at the same time provides the initial nonmagnetic section with the front end face 60b of the nonmagnetic section 60 contiguous with the first inclined portion 15T1.

Figure 7:
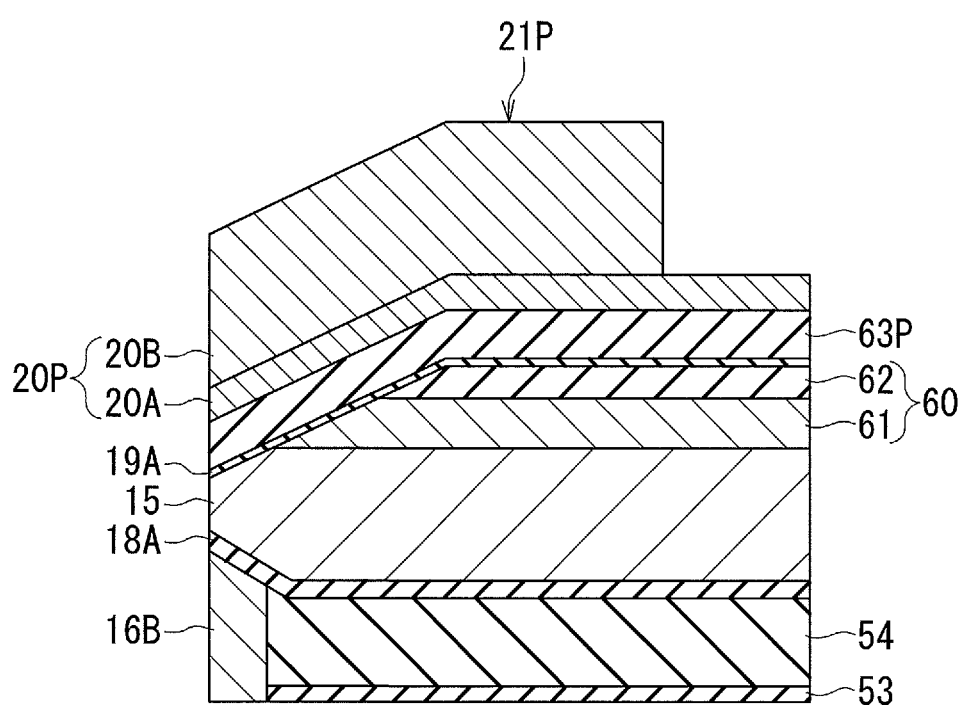
FIG. 7 is a cross-sectional view showing a step that follows the step shown in FIG. 6.

FIG. 7 shows the next step. In this step, first, the first gap layer 19A constituting at least part of the first gap section 19 is formed over the entire top surface of the stack. Then, an initial coil underlayer 63P is formed. The initial coil underlayer 63P will later become the coil underlayer 63. The initial coil underlayer 63P is formed over the entire top surface of the stack so as to cover the main pole 15 and the first gap layer 19A. The first gap layer 19A and the initial coil underlayer 63P are then selectively etched to form therein openings for exposing the top surface of the second connection layer.

Then, an initial coil 20P, which will later become the first coil 20, is formed on the initial coil underlayer 63P. The initial coil 20P includes the electrode film 20A and the conductive layer 20B. In the step of forming the initial coil 20P, first, the electrode film 20A is formed on the initial coil underlayer 63P. Then, a photoresist mask (not illustrated) having an opening shaped to correspond to the planar shape (the shape as viewed from above) of the first coil 20 is formed on the electrode film 20A. The conductive layer 20B is then formed in the opening of the photoresist mask by plating, using the electrode film 20A as an electrode and a seed. The non-illustrated photoresist mask is then removed.

The initial coil 20P includes an initial coil element 21P lying on the initial coil underlayer 63P. The initial coil element 21P will later become the specific coil element 21, and includes a portion of the electrode film 20A and a portion of the conductive layer 20B.

Figure 8:
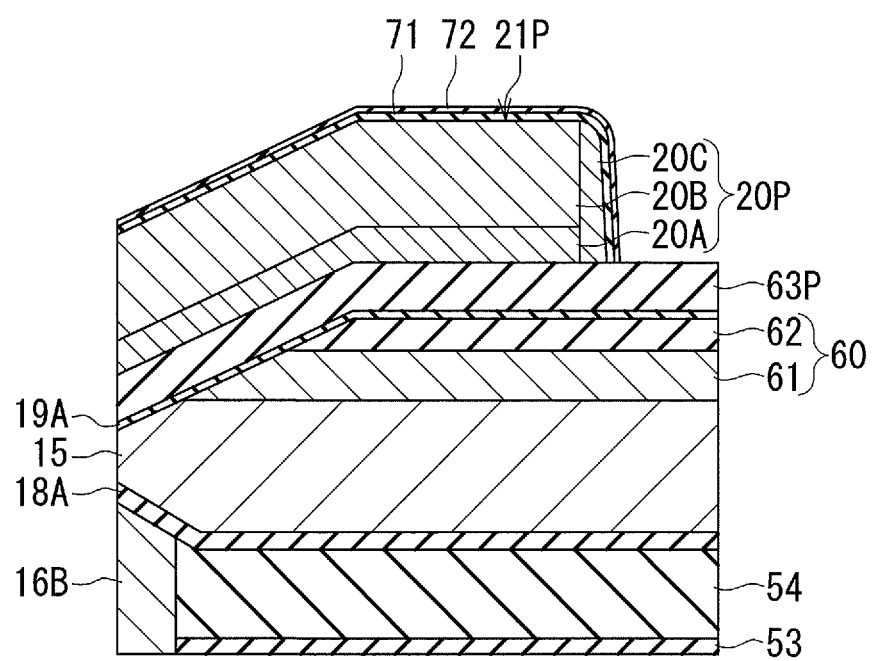
FIG. 8 is a cross-sectional view showing a step that follows the step shown in FIG. 7.

FIG. 8 shows the next step. In this step, first, the electrode film 20A except the portion thereof lying under the conductive layer 20B is removed by, for example, IBE, using the conductive layer 20B as an etching mask. Part of the flying substances generated by the etching of the electrode film 20A deposits onto the sidewalls of the electrode film 20A and the conductive layer 20B to form the deposition film 20C. In the steps shown in FIG. 8 and subsequent figures, the initial coil 20P includes the deposition film 20C, and the initial coil element 21P includes a portion of the deposition film 20C.

Next, the insulating films 71 and 72 are formed in this order to cover the initial coil 20P. The insulating films 71 and 72 are provided for protecting the initial coil 20P from a developing solution that will be used to pattern a photoresist layer in a later step. If the insulating film 71 is formed of alumina, the developing solution may etch the insulating film 71 to cause the initial coil 20P to become exposed. In order to prevent this, the insulating film 71 may be protected by forming the insulating film 72 of a material that is not etched at all or is hardly etched by the developing solution, such as $SiO_2$. Alternatively, instead of forming the insulating film 72, the insulating film 71 may be increased in thickness or be formed of a material that is not etched by the developing solution.

Figure 9:
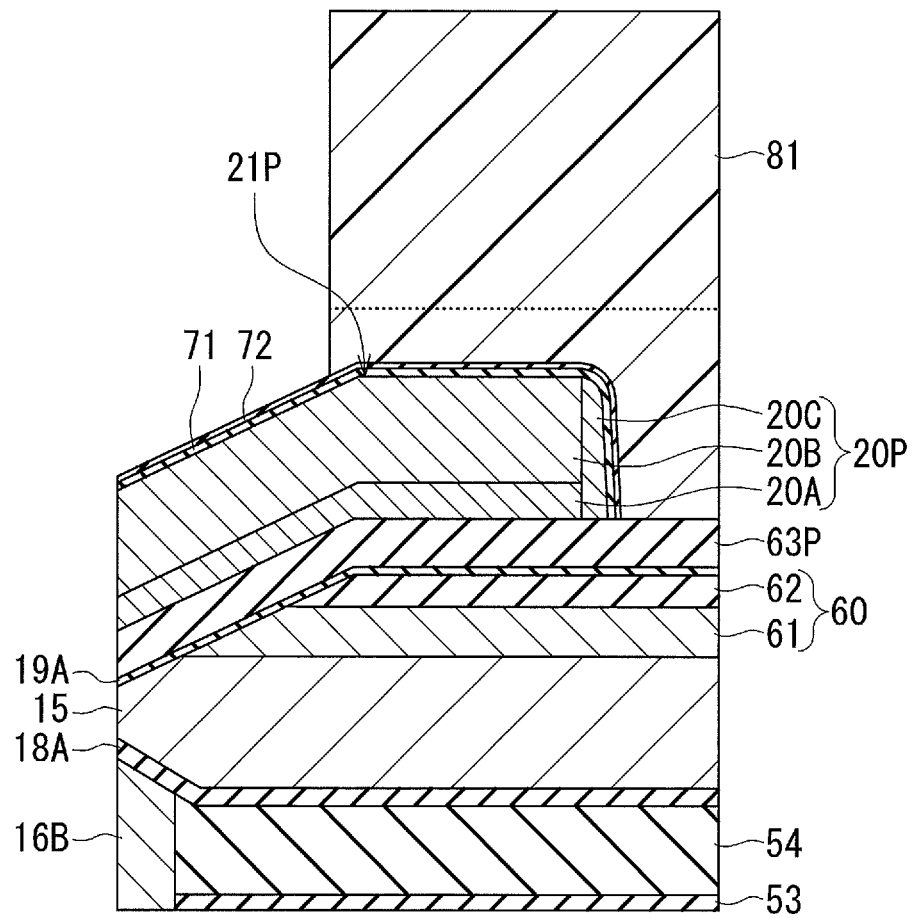
FIG. 9 is a cross-sectional view showing a step that follows the step shown in FIG. 8.

FIG. 9 shows the next step. In this step, a photoresist mask 81 is formed on the top surface of the stack so as to cover a portion of the initial coil 20P. The photoresist mask 81 does not cover a portion of the initial coil 20P where the front end face 21b of the specific coil element 21 is to be formed.

Figure 10:
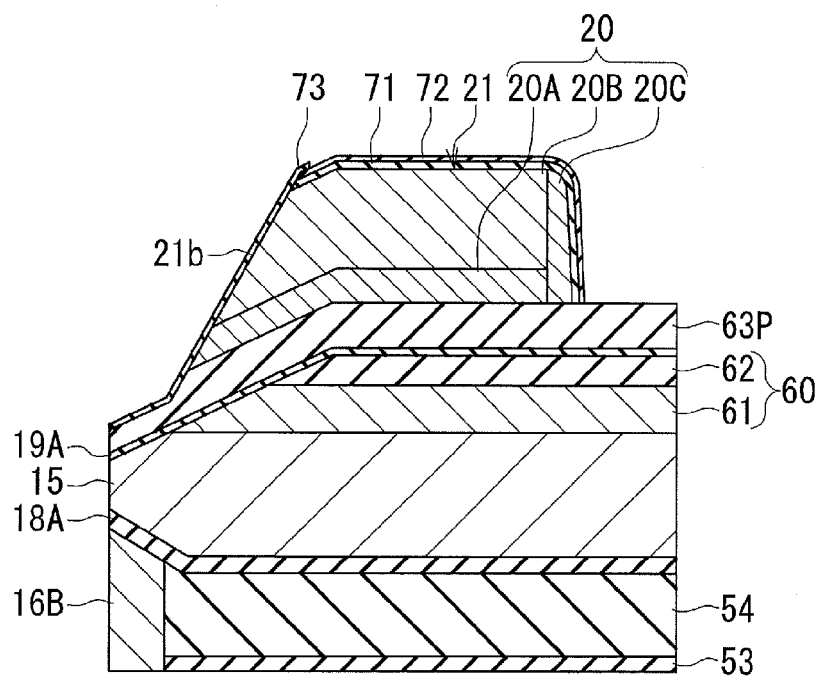
FIG. 10 is a cross-sectional view showing a step that follows the step shown in FIG. 9.

FIG. 10 shows the next step. In this step, first, the initial coil element 21P, the initial coil underlayer 63P and the insulating films 71 and 72 are etched in part by, for example, IBE, using the photoresist mask 81 as an etching mask. This etching is performed such that the bottom of the groove being formed in the initial coil underlayer 63P by this etching does not reach the top surface of the first gap layer 19A. This etching also etches a portion of the photoresist mask 81. The dotted line in the photoresist mask 81 in FIG. 9 indicates the level of the top surface of the etched photoresist mask 81. This etching makes the initial coil element 21P into the specific coil element 21, thereby making the initial coil 20P into the first coil 20.

Where IBE is employed to etch the initial coil element 21P, the coil underlayer 63 and the insulating films 71 and 72 in part, the ion beams are allowed to travel in a direction at an angle with respect to the direction perpendicular to the top surface 1a (see FIGS. 2 and 3) of the substrate 1. Performing IBE in such a manner provides the initial coil element 21P with the front end face 21b of the specific coil element 21.

Next, in the presence of the photoresist mask 81, the insulating film 73 is formed over the entire top surface of the stack. The photoresist mask 81 is then lifted off. A solvent is used for removal of the photoresist mask 81. The insulating film 73 is provided for preventing the specific coil element 21 from being corroded by the solvent.

Figure 11:
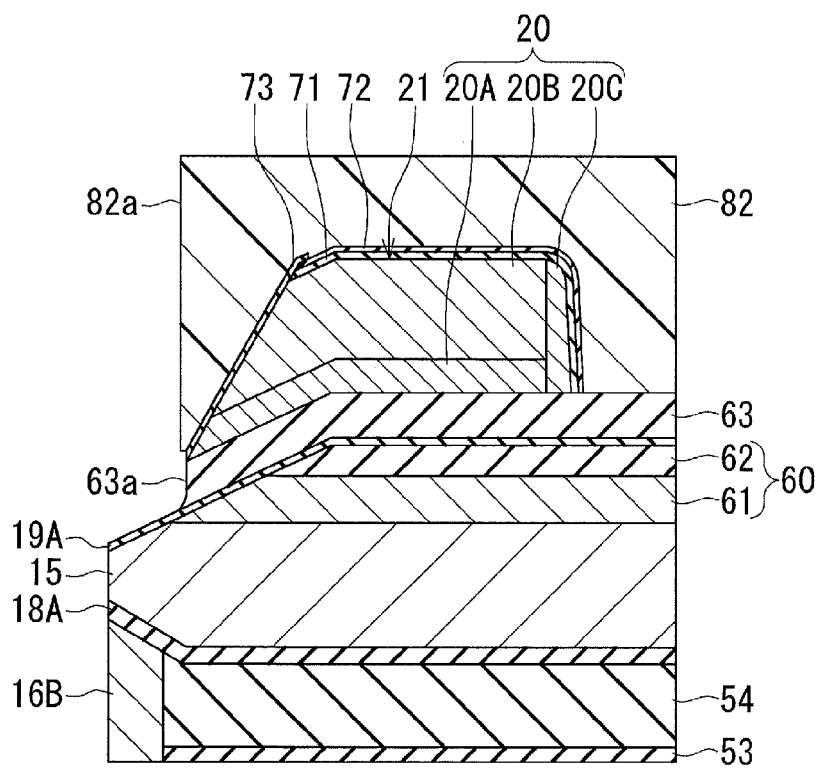
FIG. 11 is a cross-sectional view showing a step that follows the step shown in FIG. 10.

FIG. 11 shows the next step. In this step, first, a photoresist mask 82 is formed on the top surface of the stack so as to cover the specific coil element 21. The photoresist mask 82 has a wall face 82a facing toward the location at which the medium facing surface 80 is to be formed (the left side in FIG. 11). The location of the wall face 82a defines the location of the front end face 63a of the coil underlayer 63 to be formed later. Next, portions of the initial coil underlayer 63P and the insulating film 73 that are not covered with the photoresist mask 82 are removed by wet etching, for example. This provides the initial coil underlayer 63P with the front end face 63a of the coil underlayer 63, thereby making the initial coil underlayer 63P into the coil underlayer 63. The photoresist mask 82 is then removed.

Where the initial coil underlayer 63P (the coil underlayer 63) and the insulating film 73 are formed of a material different from that used to form the first gap layer 19A, the step of etching the initial coil underlayer 63P and the insulating film 73 may use the first gap layer 19A as an etching stopper layer in etching the initial coil underlayer 63P and the insulating film 73. In this case, the etching of the initial coil underlayer 63P and the insulating film 73 is performed under such conditions that the material used to form the first gap layer 19A is not etched at all or is hardly etched whereas the material used to form the initial coil underlayer 63P and the insulating film 73 is selectively etched.

If the front end face 63a of the coil underlayer 63 is located excessively close to the location at which the medium facing surface 80 is to be formed, the portion of the trailing shield 40A interposed between the front end face 63a of the coil underlayer 63 and the medium facing surface 80 becomes excessively small in volume, so that saturation of magnetic flux easily occurs in this portion. This gives rise to the problem that the magnetic flux leaks from this portion toward the medium facing surface 80, and the leakage flux causes accidental erasure of data written on the recording medium 90. The location of the wall face 82a of the photoresist mask 82 for defining the location of the front end face 63a is optimized to prevent the aforementioned problem.

Figure 12:
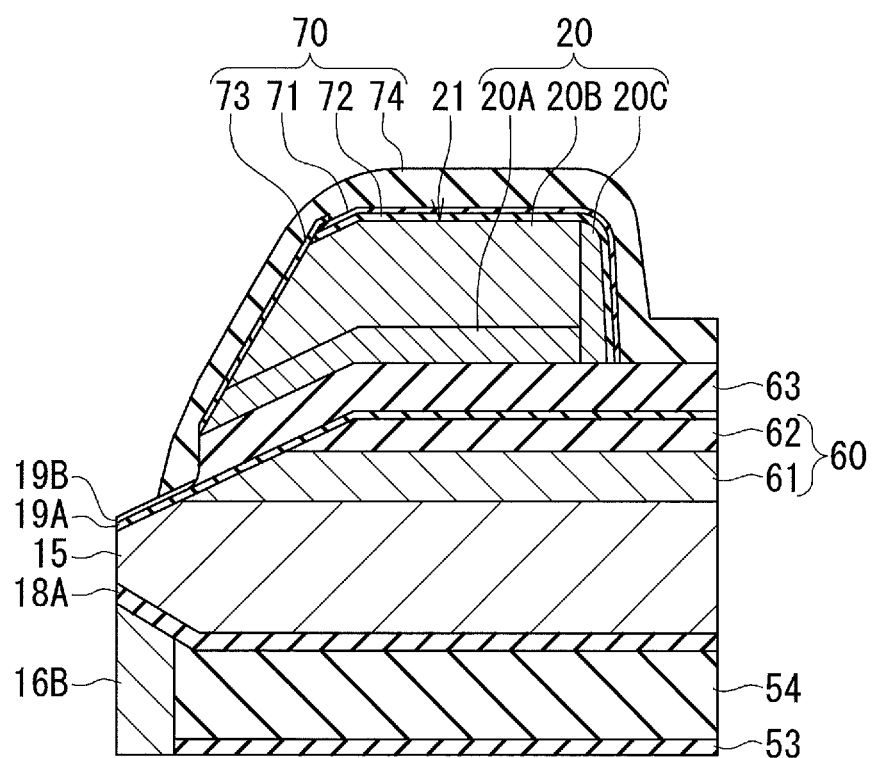
FIG. 12 is a cross-sectional view showing a step that follows the step shown in FIG. 11.

FIG. 12 shows the next step. In this step, first, the third gap layer 19B is formed over the entire top surface of the stack by atomic layer deposition, for example. The thickness of the third gap layer 19B is adjusted to obtain a desired gap length. The drawings of this application, such as FIG. 12, omit the illustration of part of the third gap layer 19B other than the part lying on the first gap layer 19A. Next, a photoresist mask (not illustrated) is formed to cover a portion of the top surface of the stack near the location at which the medium facing surface 80 is to be formed and a portion of the top surface of the stack that is located farther from the specific coil element 21 than is the aforementioned portion. In the presence of the photoresist mask, the insulating film 74 is then formed over the entire top surface of the stack by ion beam deposition, for example. The photoresist mask is then lifted off.

Figure 13:
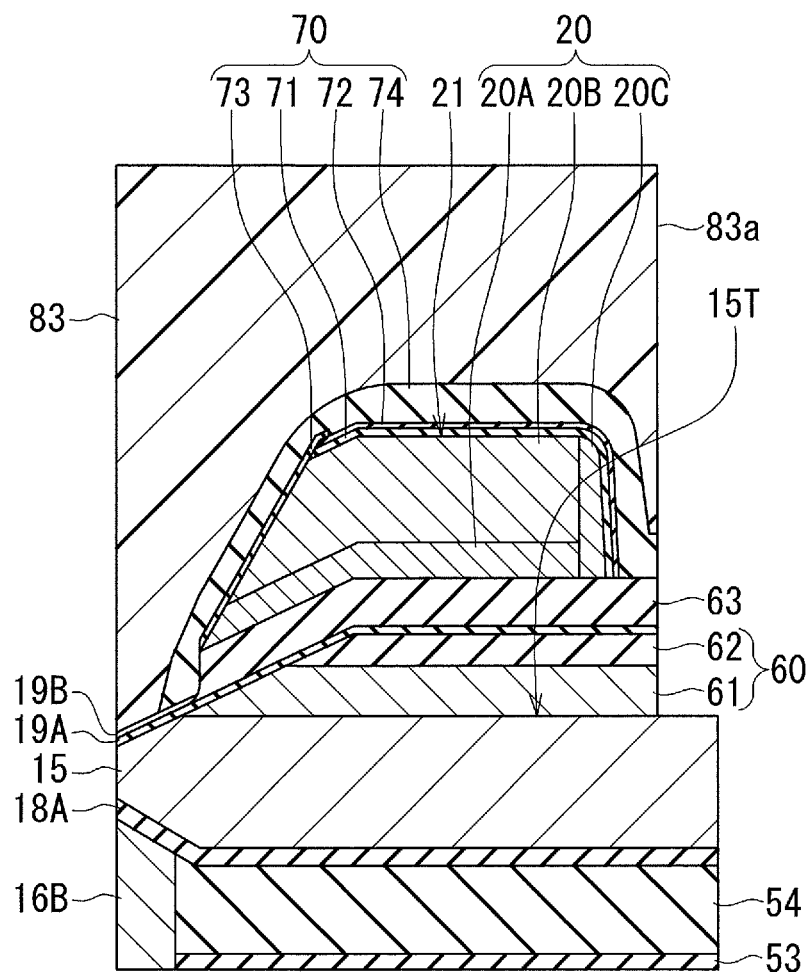
FIG. 13 is a cross-sectional view showing a step that follows the step shown in FIG. 12.

FIG. 13 shows the next step. In this step, first, a photoresist mask 83 is formed on the top surface of the stack. The photoresist mask 83 has an opening 83a located away from the location at which the medium facing surface 80 is to be formed, and two openings (not illustrated) located near the location at which the medium facing surface 80 is to be formed. Then, the first gap layer 19A, the third gap layer 19B, the nonmagnetic section 60 (the first and second nonmagnetic layers 61 and 62), the coil underlayer 63 and the insulating film 74 are etched until the top surface 15T of the main pole 15 is exposed, and the first and third gap layers 19A and 19B are etched until the top surfaces of the side shields 16C and 16D are exposed. The aforementioned etching is performed by, for example, RIE or IBE, using the photoresist mask 83 as an etching mask. The photoresist mask 83 is then removed.

Figure 14:
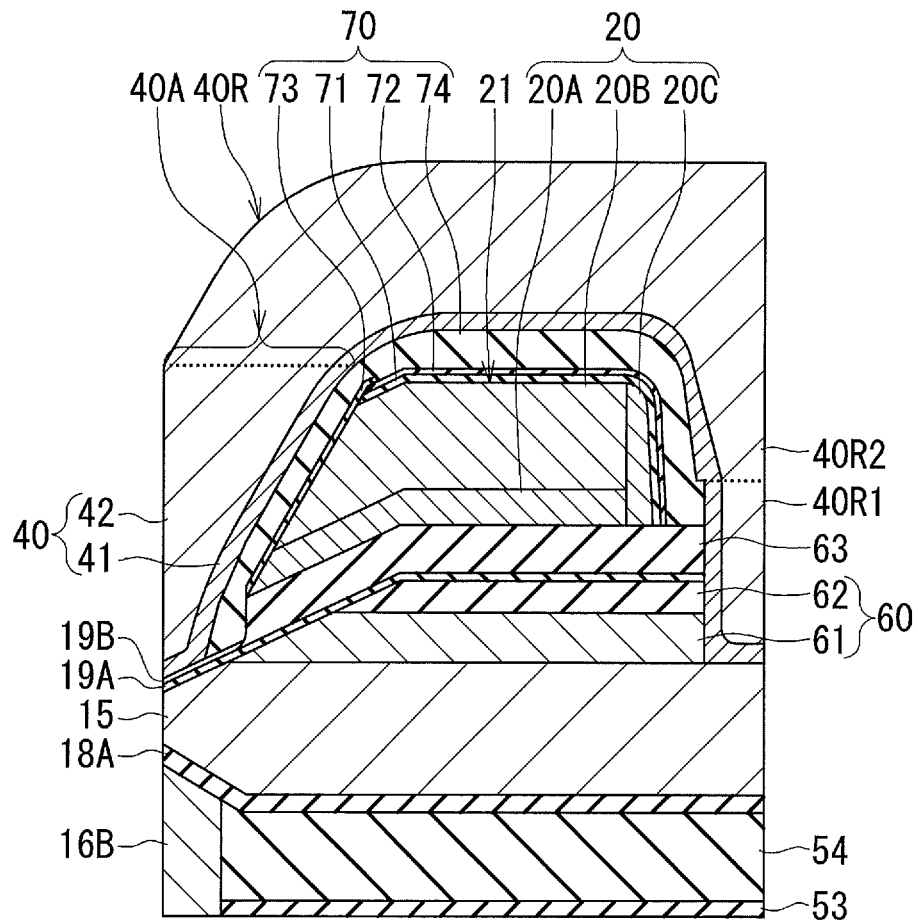
FIG. 14 is a cross-sectional view showing a step that follows the step shown in FIG. 13.

FIG. 14 shows the next step. In this step, the magnetic layer 40 constituting the trailing shield 40A and the first return path section 40R is formed. In the step of forming the magnetic layer 40, first, the electrode film 41 is formed over the entire top surface of the stack. Then, the magnetic layer body 42 is formed by plating, using the electrode film 41 as an electrode and a seed. The electrode film 41 except a portion thereof lying under the magnetic layer body 42 is then removed by, for example, IBE, using the magnetic layer body 42 as an etching mask. After the etching of the electrode film 41, a portion of the magnetic layer body 42 located near the location at which the medium facing surface 80 is to be formed may be taper-etched by IBE, for example.

Steps that follow the step shown in FIG. 14 will now be described with reference to FIGS. 2 and 3. First, the protective layer 75 is formed to cover the entire top surface of the stack. Then, wiring, terminals and other components are formed on the protective layer 75, and the substrate 1 is cut near the location at which the medium facing surface 80 is to be formed. The cut surface is then polished to form the medium facing surface 80, and processing such as fabrication of flying rails is performed to complete the magnetic head.

The method of manufacturing the magnetic head according to the present embodiment described above includes a first step of forming the main pole 15, the first gap section 19, the coil underlayer 63 and the first coil 20, and a second step of forming the trailing shield 40A and the first return path section 40R. In the present embodiment, the step of forming the magnetic layer 40 shown in FIG. 14 corresponds to the second step.

The first step includes, as shown in FIG. 6, the step of forming the magnetic layer that will become the main pole 15, and the step of etching the magnetic layer so as to provide the magnetic layer with the first inclined portion 15T1 and the flat portion 51T2 and thereby make the magnetic layer into the main pole 15. As shown in FIG. 7, the first step further includes the steps of: forming the first gap layer 19A constituting at least part of the gap section 19 after the step of etching the magnetic layer; forming the initial coil underlayer 63P to cover the main pole 15 and the first gap layer 19A; and forming the initial coil 20P which will later become the first coil 20, the initial coil 20P including the initial coil element 21P lying on the initial coil underlayer 63P.

The first step further includes the step of etching the initial coil element 21P and the initial coil underlayer 63P so as to provide the initial coil element 21P with the front end face 21b of the specific coil element 21 and thereby make the initial coil element 21P into the specific coil element 21, and provide the initial coil underlayer 63P with the front end face 63a of the coil underlayer 63 and thereby make the initial coil underlayer 63P into the coil underlayer 63, as shown in FIG. 10 and FIG. 11.

The second step forms the trailing shield 40A and at least part of the first return path section 40R connected to the trailing shield 40A after the first step. In the example shown in FIG. 14, the second step forms the trailing shield 40A and the whole of the first return path section 40R after the first step. Alternatively, for example, the second step may form the coupling portion 40R1 of the first return path section 40R during the first step and form the trailing shield 40A and the yoke portion 40R2 of the first return path section 40R connected to the trailing shield 40A after the first step.

The manufacturing method for the magnetic head according to the present embodiment allows the inclination angle and the location of the front end face 21b of the specific coil element 21 to be selected independently of the inclination angle and the location of the first inclined portion 15T1 of the top surface 15T of the main pole 15. The manufacturing method according to the present embodiment allows the inclination angle and the location of the first inclined portion 15T1 of the top surface 15T of the main pole 15 and the shapes of the end face 15a of the main pole 15 and a portion of the main pole 15 near the medium facing surface 80 to remain unchanged irrespective of any variations in thickness of the specific coil element 21 or any variations in conditions of etching of the initial coil element 21P. Consequently, the manufacturing method according to the present embodiment makes it possible to provide a magnetic head that provides the benefits described previously and achieves reduced variations in write characteristics.

In the manufacturing method according to the present embodiment, the specific coil element 21 is formed so that the bottom surface 21a of the specific coil element 21 includes the second inclined portion 21a1. Further, according to the present embodiment, as shown in FIG. 6, the first step includes the step of forming the initial nonmagnetic section on the magnetic layer that will become the main pole 15, and the step of etching the initial nonmagnetic section so as to provide the initial nonmagnetic section with the front end face 60b of the nonmagnetic section 60 and thereby make the initial nonmagnetic section into the nonmagnetic section 60. Then, according to the present embodiment, the first gap layer 19A, the initial coil underlayer 63P, and the initial coil 20P are formed in this order after the step of etching the initial nonmagnetic section. The initial coil underlayer 63P is formed to cover the main pole 15, the nonmagnetic section 60 and the first gap layer 19A. The initial coil element 21P of the initial coil 20P is formed on the initial coil underlayer 63P. By forming the nonmagnetic section 60, the initial coil underlayer 63P (the coil underlayer 63) and the initial coil element 21P (the specific coil element 21) in this manner, the resulting coil underlayer 63 includes a portion interposed between the front end face 60b of the nonmagnetic section 60 and the second inclined portion 21a1 of the bottom surface 21a of the specific coil element 21. According to the present embodiment, forming the initial coil element 21P in this manner allows for easy formation of the wedge-shaped portion of the specific coil element 21 mentioned previously.

Second Embodiment

Figure 15:
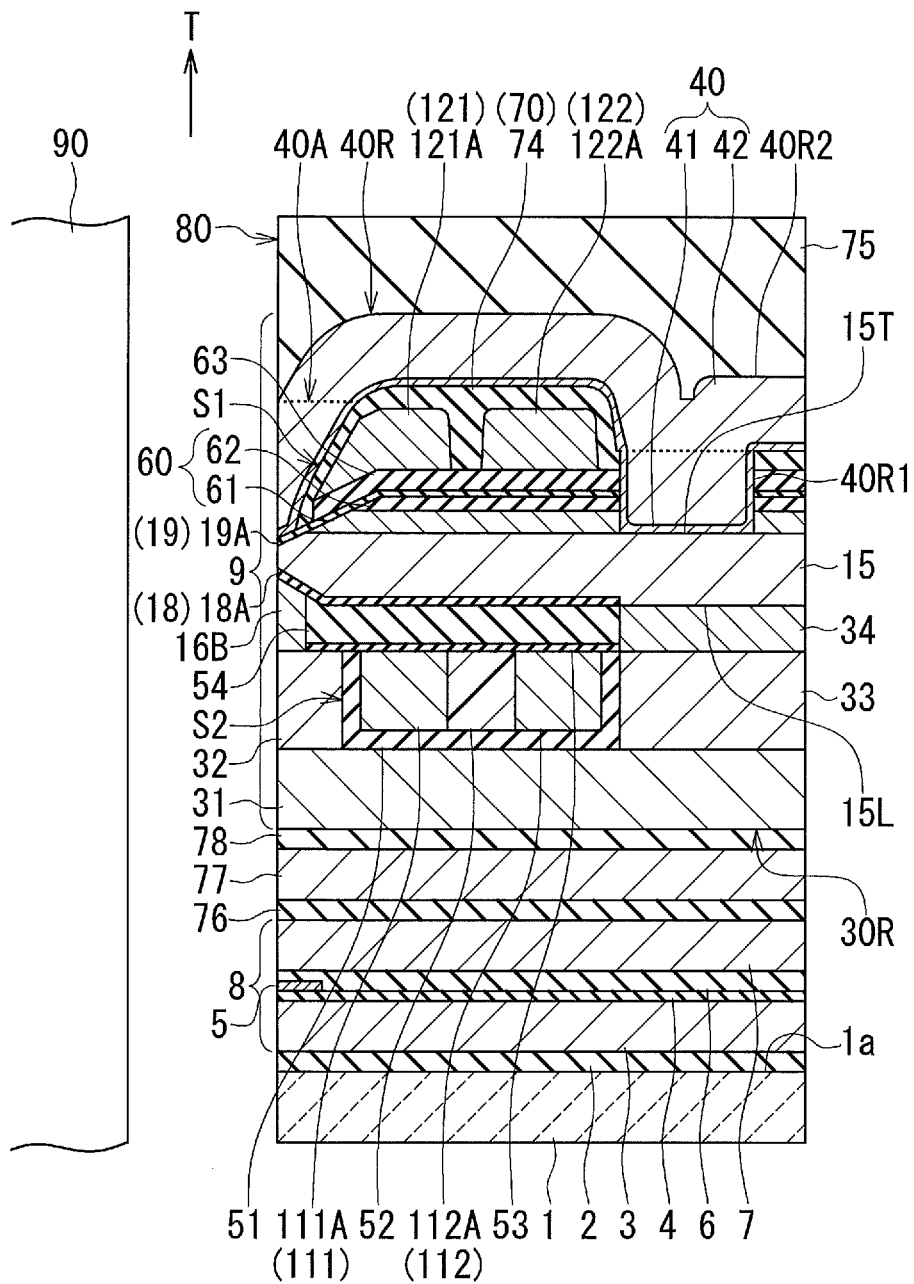
FIG. 15 is a cross-sectional view of a magnetic head according to a second embodiment of the invention.
Figure 16:
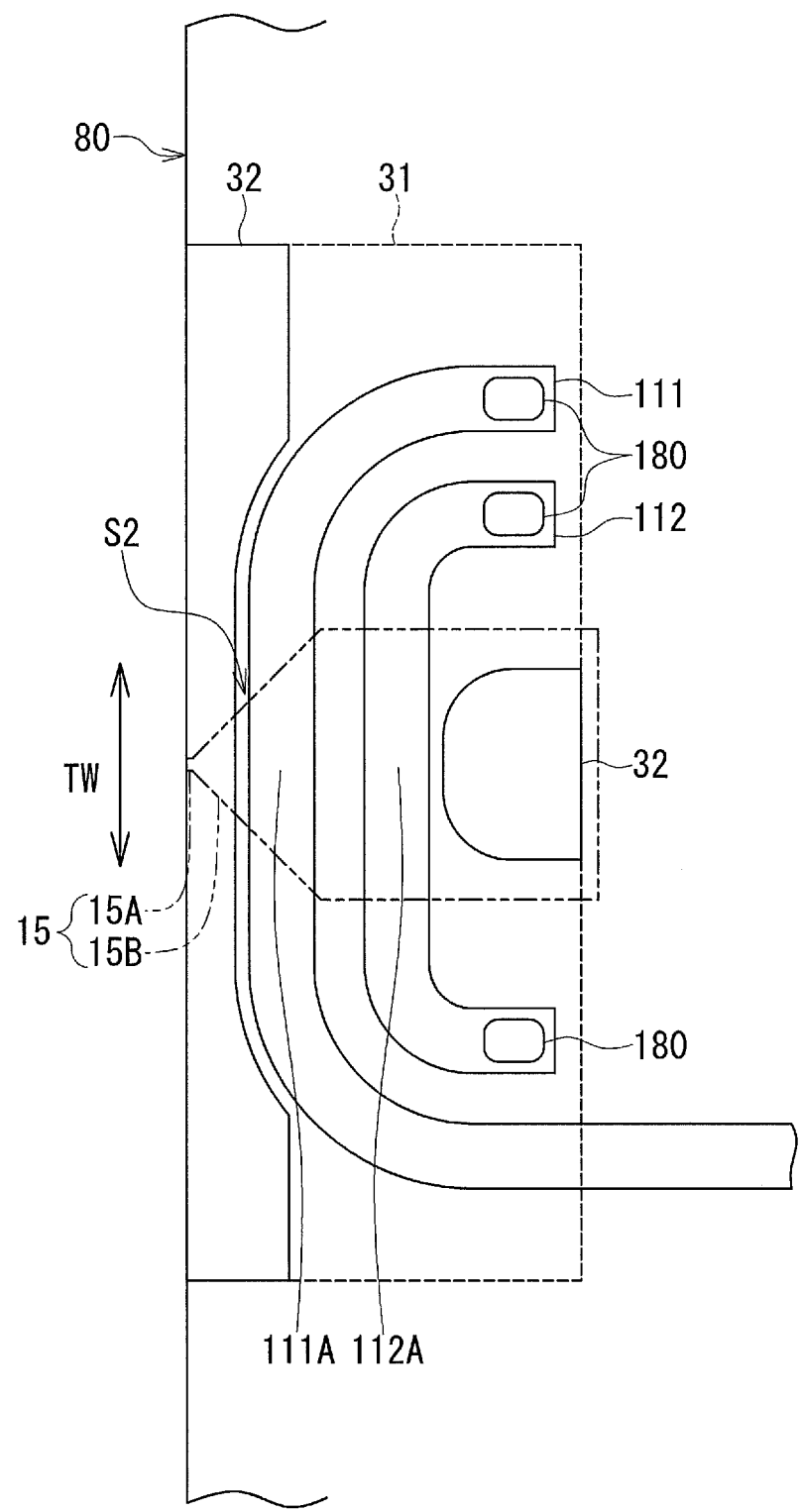
FIG. 16 is a plan view showing a plurality of second coil elements of the coil of the magnetic head according to the second embodiment of the invention.
Figure 17:
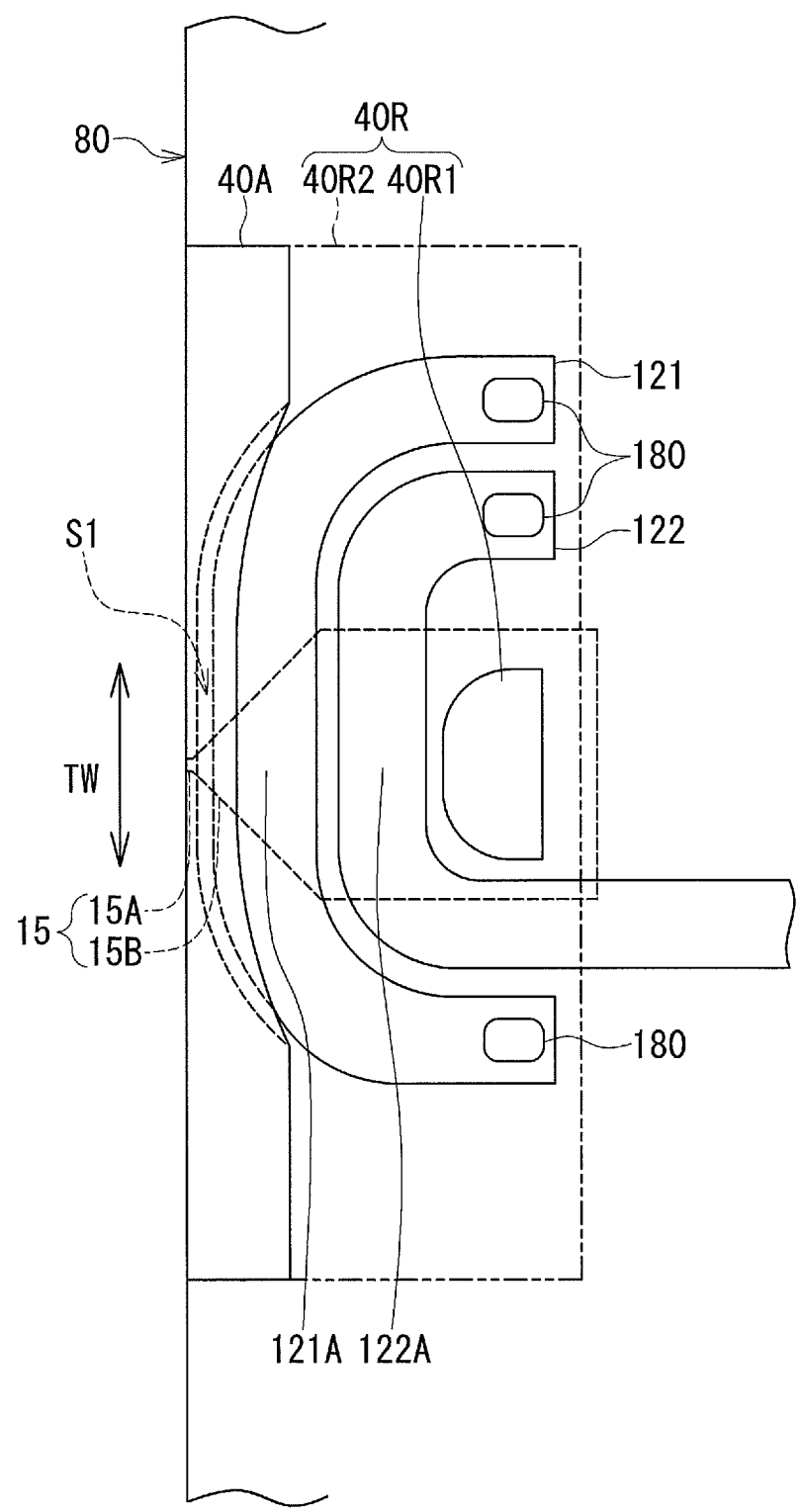
FIG. 17 is a plan view showing a plurality of first coil elements of the coil of the magnetic head according to the second embodiment of the invention.

A magnetic head according to a second embodiment of the present invention will now be described with reference to FIG. 15 to FIG. 17. FIG. 15 is a cross-sectional view of the magnetic head according to the present embodiment. FIG. 15 shows a cross section perpendicular to the medium facing surface and to the top surface of the substrate, particularly the main cross section. The arrow labeled T in FIG. 15 indicates the direction of travel of the recording medium. FIG. 16 is a plan view showing a plurality of second coil elements of the coil of the magnetic head according to the present embodiment. FIG. 17 is a plan view showing a plurality of first coil elements of the coil of the magnetic head according to the present embodiment. The arrow labeled TW in FIGS. 16 and 17 indicates the track width direction.

The magnetic head according to the present embodiment differs from the magnetic head according to the first embodiment in the following ways. The magnetic head according to the present embodiment includes a coil wound around the main pole 15, instead of the first and second coils 20 and 10 of the first embodiment. The coil of the present embodiment is wound approximately twice around the main pole 15. As shown in FIG. 15, the coil of the present embodiment includes four line-shaped portions 111, 112, 121 and 122.

As shown in FIG. 16, the line-shaped portions 111 and 112 include second coil elements 111A and 112A, respectively, each of the second coil elements 111A and 112A extending in a direction intersecting the direction perpendicular to the medium facing surface 80 to pass through the second space S2. The second coil elements 111A and 112A are adjacent to each other in the direction perpendicular to the medium facing surface 80, the coil element 111A being located closer to the medium facing surface 80 than the coil element 112A.

As shown in FIG. 17, the line-shaped portions 121 and 122 include first coil elements 121A and 122A, respectively, each of the first coil elements 121A and 122A extending in the direction intersecting the direction perpendicular to the medium facing surface 80 to pass through the first space S1. The first coil elements 121A and 122A are adjacent to each other in the direction perpendicular to the medium facing surface 80, the coil element 121A being located closer to the medium facing surface 80 than the coil element 122A. As shown in FIG. 15, the second coil elements 111A and 112A are located such that the main pole 15 is interposed between the first coil elements 121A, 122A and the second coil elements 111A, 112A.

The line-shaped portions 111 and 112 are electrically connected to the line-shaped portions 121 and 122 via three connection layers 180 of columnar shape penetrating a plurality of layers interposed therebetween, so that a coil wound helically around the main pole 15 is formed.

Since the line-shaped portions 111, 112, 121 and 122 are portions of the coil of the present embodiment, the coil of the present embodiment can be said to include two first coil elements 121A and 122A and two second coil elements 111A and 112A. In the present embodiment, the first coil element 121A is the specific coil element. The shape and location of the specific coil element 121A are the same as those of the specific coil element 21 of the first embodiment. More specifically, the specific coil element 121A has a front end face facing toward the medium facing surface 80, and the front end face has a third end closest to the main pole 15 and a fourth end opposite to the third end. The front end face of the specific coil element 121A is inclined with respect to the medium facing surface 80 and the direction perpendicular to the medium facing surface 80 such that the fourth end is located at a greater distance from the medium facing surface 80 than is the third end.

Like the first embodiment, the present embodiment makes it possible to reduce the distance from the end of the coil closest to the medium facing surface 80, that is, the third end of the specific coil element 121A, to each of the medium facing surface 80 and the main pole 15. Since the coil of the present embodiment is wound helically around the main pole 15, reducing the distance from the end of the coil closest to the medium facing surface 80 to each of the medium facing surface 80 and the main pole 15 allows for enhancement of the write magnetic field produced from the main pole 15.

The remainder of configuration, function and effects of the present embodiment are similar to those of the first embodiment.

The present invention is not limited to the foregoing embodiments, and various modifications may be made thereto. For example, as far as the requirements of the appended claims are met, the main pole 15, the trailing shield 40A, the specific coil element 21 or 121, and the coil underlayer 63 may be shaped and located as desired, and need not necessarily be as in the respective examples illustrated in the foregoing embodiments.

Obviously, many modifications and variations of the present invention are possible in the light of the above teachings. Thus, it is to be understood that, within the scope of the appended claims and equivalents thereof, the invention may be practiced in other than the foregoing most preferable embodiments.

What is claimed is:

1. A magnetic head for perpendicular magnetic recording, comprising:
   a medium facing surface configured to face a recording medium;
   a coil for producing a magnetic field corresponding to data to be written on the recording medium;
   a main pole having an end face located in the medium facing surface, the main pole being configured to pass a magnetic flux corresponding to the magnetic field produced by the coil, and to produce a write magnetic field for use to write the data on the recording medium by means of a perpendicular magnetic recording system;
   a trailing shield formed of a magnetic material and having an end face located on a front side in a direction of travel of the recording medium relative to the end face of the main pole;
   a gap section formed of a nonmagnetic material and located between the main pole and the trailing shield;
   a return path section formed of a magnetic material and located on the front side in the direction of travel of the recording medium relative to the main pole; and
   a coil underlayer formed of a nonmagnetic material, wherein
   the return path section connects the trailing shield and part of the main pole located away from the medium facing surface to each other so that a space is defined by the main pole, the gap section, the trailing shield and the return path section,
   the coil includes at least one first coil element extending to pass through the space,
   the main pole has a top surface located at a front-side end of the main pole in the direction of travel of the recording medium,
   the top surface of the main pole includes a first inclined portion and a flat portion, the first inclined portion being located closer to the medium facing surface than the flat portion,
   the first inclined portion has a first end located in the medium facing surface and a second end opposite to the first end,
   the first inclined portion is inclined with respect to the medium facing surface and a direction perpendicular to the medium facing surface such that the second end is located on the front side in the direction of travel of the recording medium relative to the first end,
   the flat portion extends substantially perpendicular to the medium facing surface,
   the at least one first coil element includes a specific coil element,
   the specific coil element has a bottom surface facing toward the top surface of the main pole, and a front end face facing toward the medium facing surface,
   the front end face of the specific coil element has a third end closest to the main pole, and a fourth end opposite to the third end,
   the front end face of the specific coil element is inclined with respect to the medium facing surface and the direction perpendicular to the medium facing surface such that the fourth end is located at a greater distance from the medium facing surface than is the third end,
   the coil underlayer lies under at least the specific coil element of the coil, and has a front end face facing toward the medium facing surface,
   the trailing shield includes a portion interposed between the front end face of the coil underlayer and the medium facing surface,
   the bottom surface of the specific coil element includes a second inclined portion,
   the second inclined portion has a fifth end closest to the medium facing surface, and a sixth end opposite to the fifth end,
   the fifth end coincides with the third end of the front end face of the specific coil element,
   the second inclined portion is inclined with respect to the medium facing surface and the direction perpendicular to the medium facing surface such that the sixth end is located on the front side in the direction of travel of the recording medium relative to the fifth end, and
   the front end face of the specific coil element is inclined at a greater angle with respect to the direction perpendicular to the medium facing surface than is the second inclined portion.

2. The magnetic head for perpendicular magnetic recording according to claim 1, wherein the front end face of the specific coil element is inclined at a greater angle with respect to the direction perpendicular to the medium facing surface than is the first inclined portion.

3. The magnetic head for perpendicular magnetic recording according to claim 1, further comprising a nonmagnetic section formed of a nonmagnetic material and lying on the flat portion of the top surface of the main pole, wherein
   the nonmagnetic section has a top surface located at a front-side end of the nonmagnetic section in the direction of travel of the recording medium, and a front end face facing toward the medium facing surface and contiguous with the first inclined portion, and
   the coil underlayer includes a portion interposed between the front end face of the nonmagnetic section and the second inclined portion.

4. The magnetic head for perpendicular magnetic recording according to claim 1, wherein the coil further includes at least one second coil element, the at least one second coil element being located such that the main pole is interposed between the at least one first coil element and the at least one second coil element, and extending in a direction intersecting the direction perpendicular to the medium facing surface.

5. A method of manufacturing a magnetic head for perpendicular magnetic recording, the magnetic head comprising:
   a medium facing surface configured to face a recording medium;
   a coil for producing a magnetic field corresponding to data to be written on the recording medium;
   a main pole having an end face located in the medium facing surface, the main pole being configured to pass a magnetic flux corresponding to the magnetic field produced by the coil, and to produce a write magnetic field for use to write the data on the recording medium by means of a perpendicular magnetic recording system;
   a trailing shield formed of a magnetic material and having an end face located on a front side in a direction of travel of the recording medium relative to the end face of the main pole;
   a gap section formed of a nonmagnetic material and located between the main pole and the trailing shield;
   a return path section formed of a magnetic material and located on the front side in the direction of travel of the recording medium relative to the main pole; and a coil underlayer formed of a nonmagnetic material, wherein the return path section connects the trailing shield and part of the main pole located away from the medium facing surface to each other so that a space is defined by the main pole, the gap section, the trailing shield and the return path section, the coil includes at least one first coil element extending to pass through the space, the main pole has a top surface located at a front-side end of the main pole in the direction of travel of the recording medium, the top surface of the main pole includes a first inclined portion and a flat portion, the first inclined portion being located closer to the medium facing surface than the flat portion, the first inclined portion has a first end located in the medium facing surface and a second end opposite to the first end, the first inclined portion is inclined with respect to the medium facing surface and a direction perpendicular to the medium facing surface such that the second end is located on the front side in the direction of travel of the recording medium relative to the first end, the flat portion extends substantially perpendicular to the medium facing surface, the at least one first coil element includes a specific coil element, the specific coil element has a bottom surface facing toward the top surface of the main pole, and a front end face facing toward the medium facing surface, the front end face of the specific coil element has a third end closest to the main pole, and a fourth end opposite to the third end, the front end face of the specific coil element is inclined with respect to the medium facing surface and the direction perpendicular to the medium facing surface such that the fourth end is located at a greater distance from the medium facing surface than is the third end, the coil underlayer lies under at least the specific coil element of the coil, and has a front end face facing toward the medium facing surface, and the trailing shield includes a portion interposed between the front end face of the coil underlayer and the medium facing surface, the method comprising:

a first step of forming the main pole, the gap section, the coil underlayer and the coil; and a second step of forming the trailing shield and the return path section, wherein the first step includes the steps of:
forming a magnetic layer;
etching the magnetic layer so as to provide the magnetic layer with the first inclined portion and the flat portion and thereby make the magnetic layer into the main pole;
forming a gap layer after the step of etching the magnetic layer, the gap layer constituting at least part of the gap section;
forming an initial coil underlayer to cover the main pole and the gap layer;
forming an initial coil which will later become the coil, the initial coil including an initial coil element lying on the initial coil underlayer; and
etching the initial coil element and the initial coil underlayer so as to provide the initial coil element with the front end face of the specific coil element and thereby make the initial coil element into the specific coil element, and provide the initial coil underlayer with the front end face of the coil underlayer and thereby make the initial coil underlayer into the coil underlayer, and the second step forms the trailing shield and at least part of the return path section connected to the trailing shield after the first step.

6. The method of manufacturing the magnetic head for perpendicular magnetic recording according to claim 5, wherein the front end face of the specific coil element is inclined at a greater angle with respect to the direction perpendicular to the medium facing surface than is the first inclined portion.

7. The method of manufacturing the magnetic head for perpendicular magnetic recording according to claim 5, wherein the specific coil element is formed so that the bottom surface of the specific coil element includes a second inclined portion, the second inclined portion has a fifth end closest to the medium facing surface, and a sixth end opposite to the fifth end, the fifth end coincides with the third end of the front end face of the specific coil element, the second inclined portion is inclined with respect to the medium facing surface and the direction perpendicular to the medium facing surface such that the sixth end is located on the front side in the direction of travel of the recording medium relative to the fifth end, and the front end face of the specific coil element is inclined at a greater angle with respect to the direction perpendicular to the medium facing surface than is the second inclined portion.

8. The method of manufacturing the magnetic head for perpendicular magnetic recording according to claim 7, wherein the magnetic head further comprises a nonmagnetic section formed of a nonmagnetic material and lying on the flat portion of the top surface of the main pole, the nonmagnetic section has a top surface located at a front-side end of the nonmagnetic section in the direction of travel of the recording medium, and a front end face facing toward the medium facing surface and contiguous with the first inclined portion, the first step further comprises the step of forming an initial nonmagnetic section on the magnetic layer, and the step of etching the initial nonmagnetic section so as to provide the initial nonmagnetic section with the front end face of the nonmagnetic section and thereby make the initial nonmagnetic section into the nonmagnetic section, and the coil underlayer is formed to include a portion interposed between the front end face of the nonmagnetic section and the second inclined portion.

9. The method of manufacturing the magnetic head for perpendicular magnetic recording according to claim 5, wherein the material used to form the coil underlayer is different from that used to form the gap layer, and in the step of etching the initial coil element and the initial coil underlayer, the initial coil underlayer is etched using the gap layer as an etching stopper layer.

* * * * *